US012424076B2

(12) United States Patent
Aksoy et al.

(10) Patent No.: US 12,424,076 B2
(45) Date of Patent: Sep. 23, 2025

(54) ENHANCED VISUAL AND AUDIO DEVICE FOR USE IN ACCESS CONTROL SYSTEMS

(71) Applicant: PLUGOUT, LLC, Englewood, NJ (US)

(72) Inventors: John C. Aksoy, Englewood, NJ (US); Luis E. Vega, Lakeland, FL (US); Mohammad Hasani, Brooklyn, NY (US)

(73) Assignee: PLUGOUT, LLC, Englewood, NJ (US)

( * ) Notice: Subject to any disclaimer, the term of this patent is extended or adjusted under 35 U.S.C. 154(b) by 0 days.

(21) Appl. No.: 17/960,513

(22) Filed: Oct. 5, 2022

(65) Prior Publication Data

US 2024/0029540 A1 Jan. 25, 2024

Related U.S. Application Data

(60) Provisional application No. 63/391,558, filed on Jul. 22, 2022.

(51) Int. Cl.

| | |
|---|---|
| ***G08B 21/22*** | (2006.01) |
| ***G07C 9/20*** | (2020.01) |
| ***G08B 3/10*** | (2006.01) |
| ***G08B 5/22*** | (2006.01) |
| ***G08B 5/36*** | (2006.01) |

(52) U.S. Cl.

CPC ............... *G08B 21/22* (2013.01); *G07C 9/20* (2020.01); *G08B 3/1008* (2013.01); *G08B 5/222* (2013.01); *G08B 5/36* (2013.01)

(58) Field of Classification Search

CPC ...... G08B 21/22; G08B 3/1008; G08B 5/222; G08B 5/36; G07C 9/20

See application file for complete search history.

(56) References Cited

U.S. PATENT DOCUMENTS

| | | | | |
|---|---|---|---|---|
| 10,810,813 B1 * | 10/2020 | Yang | ...................... | H04N 7/183 |
| 2015/0070181 A1 * | 3/2015 | Fadell | ...................... | G08B 21/22 340/628 |
| 2019/0295340 A1 * | 9/2019 | Browning | ................ | G07C 9/22 |
| 2022/0114546 A1 * | 4/2022 | Carter | ................. | H04W 12/069 |
| 2022/0292902 A1 * | 9/2022 | Khadloya | .............. | G06N 3/063 |

FOREIGN PATENT DOCUMENTS

WO WO-2022128626 A1 * 6/2022 ......... G07C 9/00174

* cited by examiner

*Primary Examiner* — Curtis A Kuntz
*Assistant Examiner* — James E Munion
(74) *Attorney, Agent, or Firm* — BOTOS CHURCHILL IP LAW LLP

(57) ABSTRACT

Described herein are enhanced visual & audio devices for use in access control systems. In one aspect, the device includes a reader, a first sensor, and at least one processor. The reader receives a user credential. The first sensor detects motion within a predetermined distance from the device. The at least one processor triggers at least one output notification if motion within the predetermined distance from the device has been detected by the first sensor. In one aspect, the device is mounted to a surface proximately to an access point to a controlled area and the device includes a second sensor that detects motion that is indicative of a person passing through the access point.

21 Claims, 21 Drawing Sheets

WIEGAND SCHEMATIC

ENHANCED VISUAL AND AUDIO DEVICE FOR USE IN ACCESS CONTROL SYSTEMS

CROSS REFERENCE TO RELATED APPLICATIONS

This application claims the priority of and benefit from U.S. Provisional Application No. 63/391,558, filed Jul. 22, 2022, which is incorporated by reference herein.

TECHNICAL FIELD

The present technology relates to enhanced visual and audio devices for use in access control systems.

BACKGROUND

Access control is critical in many commercial and non-commercial settings. For example, for structures such as hospitals, data centers, company premises, etc., including controlled spaces (e.g., office space, storage space, operating room, safe, etc.), controlling the access to such controlled spaces is paramount for enabling security. For this purpose, many such facilities employ access control systems for monitoring and controlling the access into and out of and within the various controlled spaces of the facility.

However, many access control systems merely rely on the use of basic card readers and thus are very limited in functionality. Therefore, a need exists for improved devices and components for use in access control systems.

BRIEF SUMMARY

Described herein are enhanced visual and audio devices for use in access control systems.

In one aspect, a device is provided comprising: a reader configured to receive a user credential; a first sensor configured to detect motion within a predetermined distance from the device; at least one processor configured to trigger at least one output notification if motion within the predetermined distance from the device has been detected by the first sensor.

In one aspect, the predetermined distance is in a range of 2-3 feet.

In one aspect, the device is mounted to a surface proximately to an access point to a controlled area and the device further comprises a second sensor configured to detect motion that is indicative of a person or object passing through the access point.

In one aspect, the at least one processor is configured to send at least one signal to an external computing device if motion is detected by the second sensor.

In one aspect, the external computing device is a controller of an access control system.

In one aspect, the first sensor is oriented in a first direction and the second sensor is oriented in a second direction, the first direction being at an angle relative to the second direction.

In one aspect, the device further comprises a housing, the housing comprising a front surface and a side surface adjacent to and oriented at an angle relative to the front surface, wherein the first sensor is oriented toward an area exterior to the front surface and the second sensor is oriented toward an area exterior to the side surface.

In one aspect, in response to receiving a first type of signal, the at least one processor is configured to take no action for a predetermined period of time in response to receiving any signals from the first sensor and/or the second sensor.

In one aspect, in response to receiving a second type of signal, the at least one processor is configured to take no action for a predetermined period of time in response to receiving any signals from the first sensor.

In one aspect, the first type of signal is a signal indicating that access to the controlled area is granted and the second type of signal is a signal indicating that access to the controlled area is denied.

In one aspect, the at least one output notification is at least one of: an alarm sound and/or a pre-recorded message; text displayed on a display screen and/or a change in background color displayed on the display screen; and/or activation of one or more indicator lights.

In one aspect, the device further comprises a speaker configured to generate the alarm sound and/or play the pre-recorded message, wherein the at least one processor is configured to control the speaker to generate the alarm sound and/or play the pre-recorded message.

In one aspect, the device further comprises the display screen, wherein the at least one processor is configured to control the display screen to display the text and/or change the background color.

In one aspect, the device further comprises the one or more indicator lights, wherein the at least one processor is configured to control the one or more indicator lights.

In one aspect, the device further comprises a camera configured to capture at least one of an image and/or video exterior to the device.

In one aspect, the device further comprises a tilt sensor configured to detect tilting of the device.

In one aspect, the at least one processor is configured to trigger an alarm condition if the at least one processor determines based on at least one signal from the tilt sensor that the device has been tilted by at least a predetermined angle relative to a baseline position of the device.

In one aspect, the device further comprises a second sensor configured to detect a distance between the device and a surface that the device is mounted to, wherein the at least one processor is configured to trigger an alarm condition if the at least one processor determines, based on at least one signal from the second sensor, that the distance between the device and the surface has changed.

In another aspect, a device is provided comprising: a housing that is mountable to a surface proximately to an access point to a controlled area, the housing comprising a front surface and a side surface adjacent to and oriented at an angle relative to the front surface; a first sensor configured to detect motion within a predetermined distance from the device, wherein the first sensor is oriented toward an area exterior to the front surface; a second sensor configured to detect motion that is indicative of a person or object passing through the access point, the second sensor is oriented toward an area exterior to the side surface; and at least one processor, wherein the at least one processor is configured to trigger at least one output notification if motion within the predetermined distance from the device has been detected by the first sensor, wherein the at least one processor is configured to send at least one signal to an external computing device if motion is detected by the second sensor.

DETAILED DESCRIPTION

Figure 2:
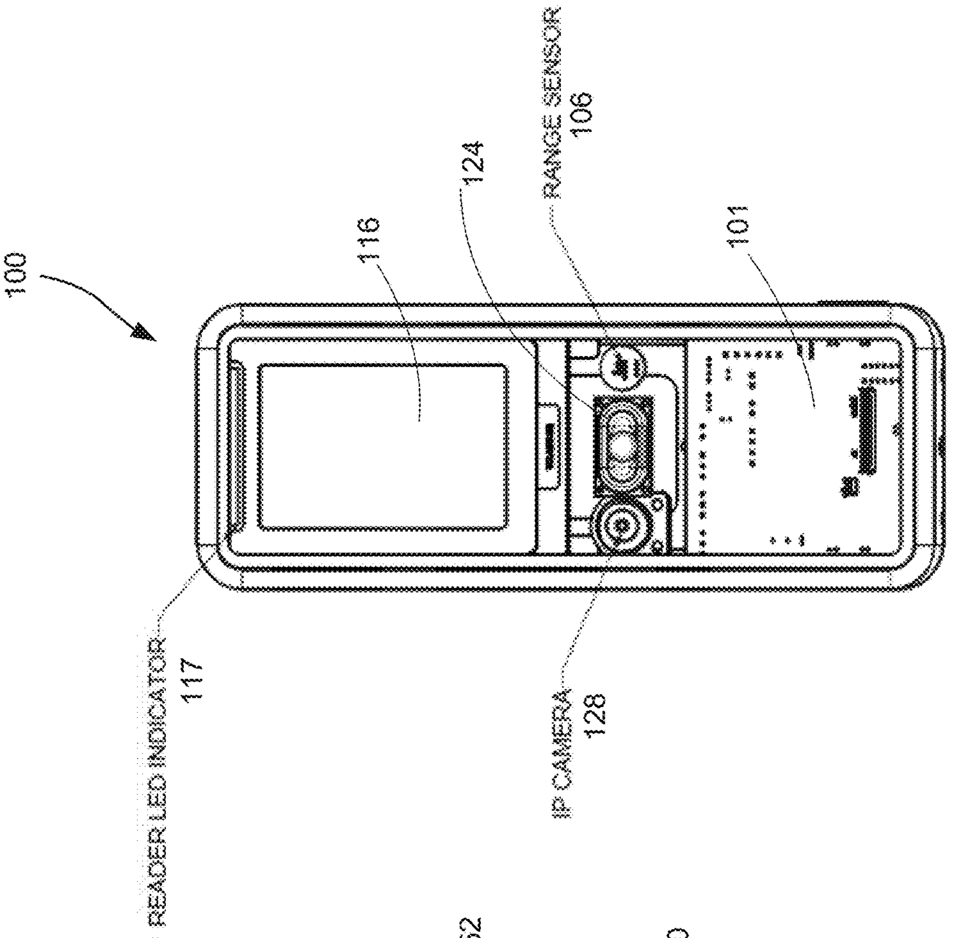
FIG. 2 is the front view of FIG. 1 with a front panel of the EVAD removed.
Figure 1:
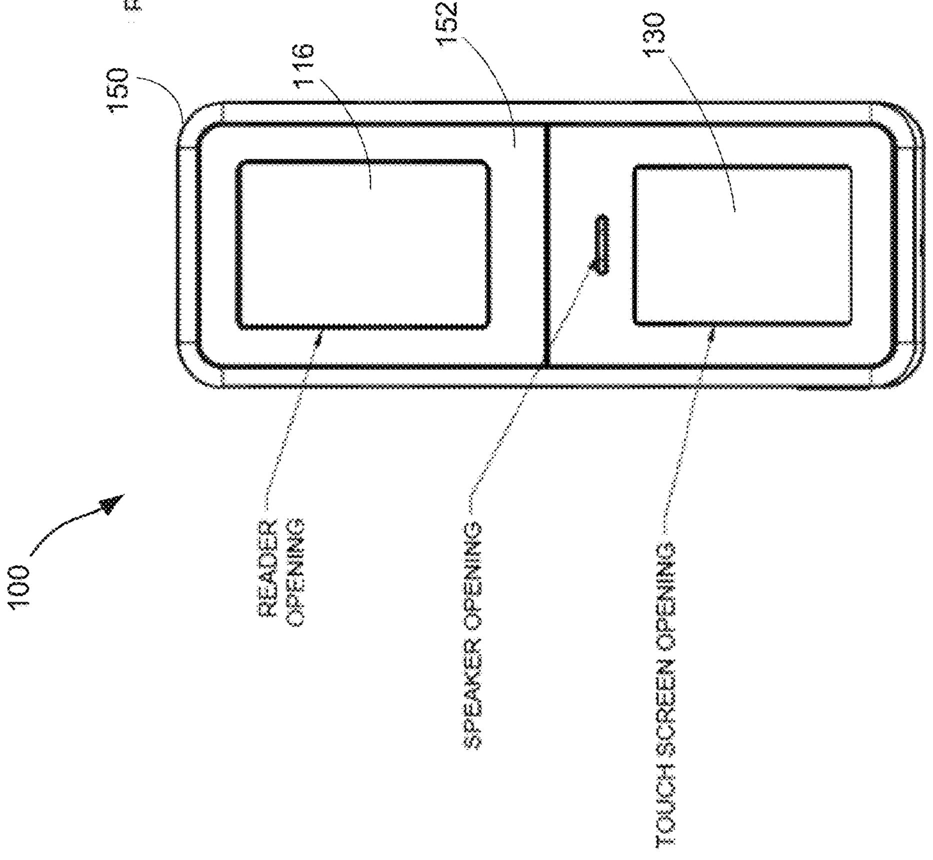
FIG. 1 includes a front view of an enhanced visual and audio device (EVAD) in accordance with an aspect of the present technology.
Figure 4:
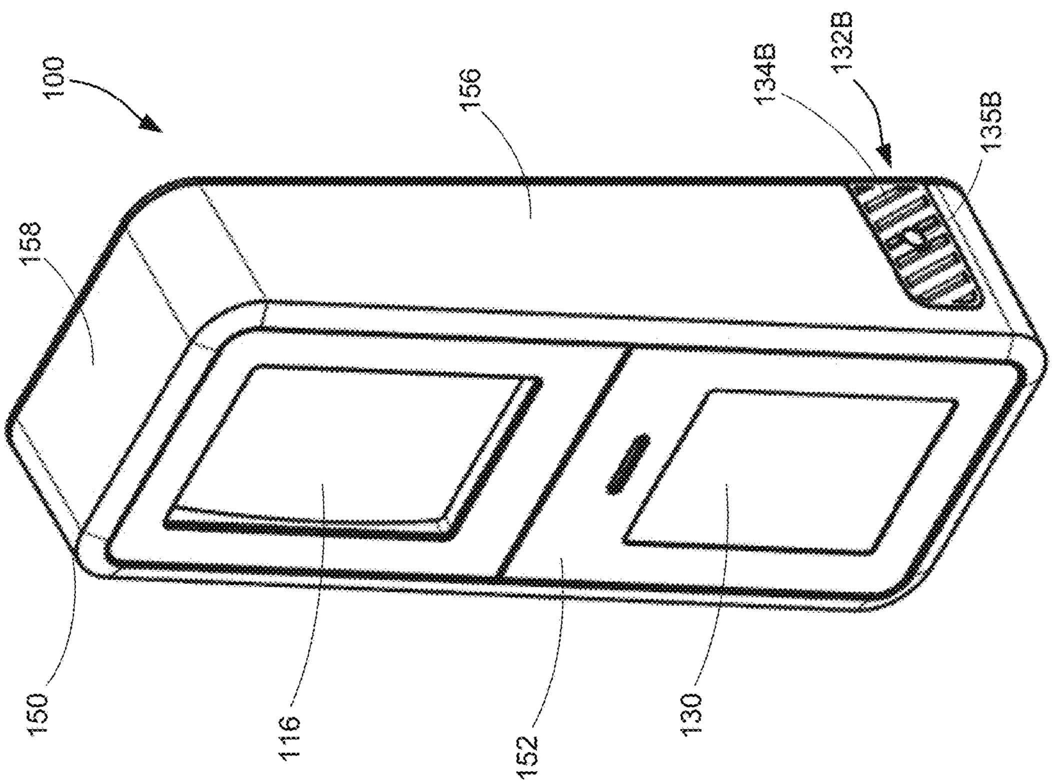
FIGS. 3-10 include perspective view of the EVAD of FIG. 1.
Figure 3:
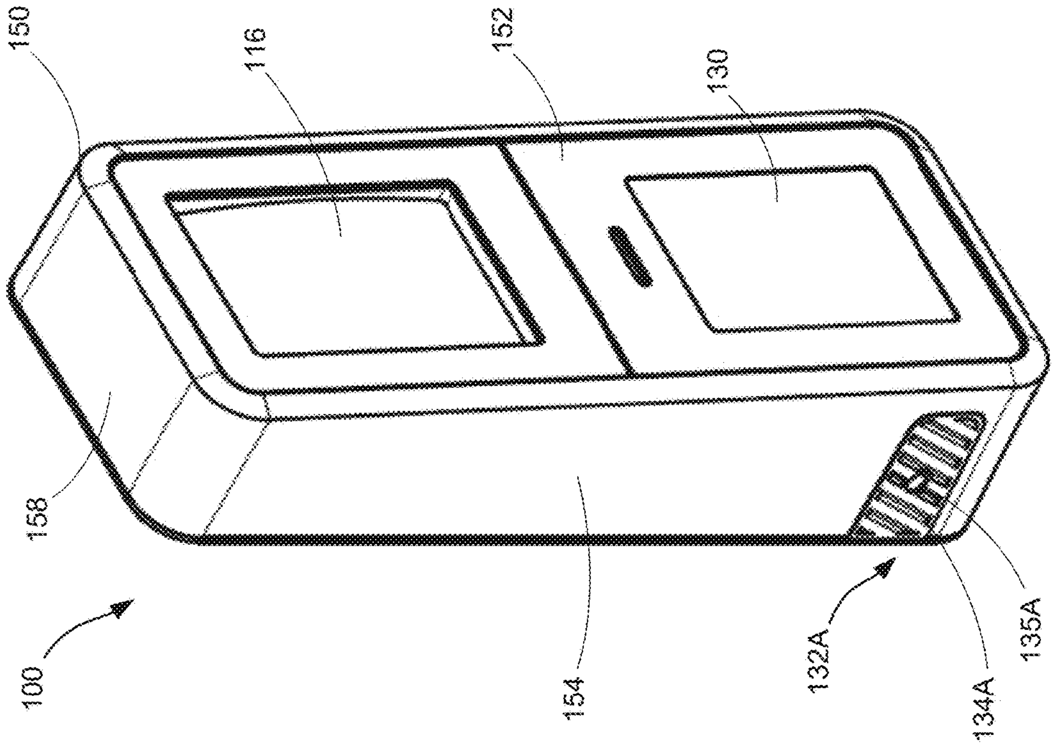
Figure 5:
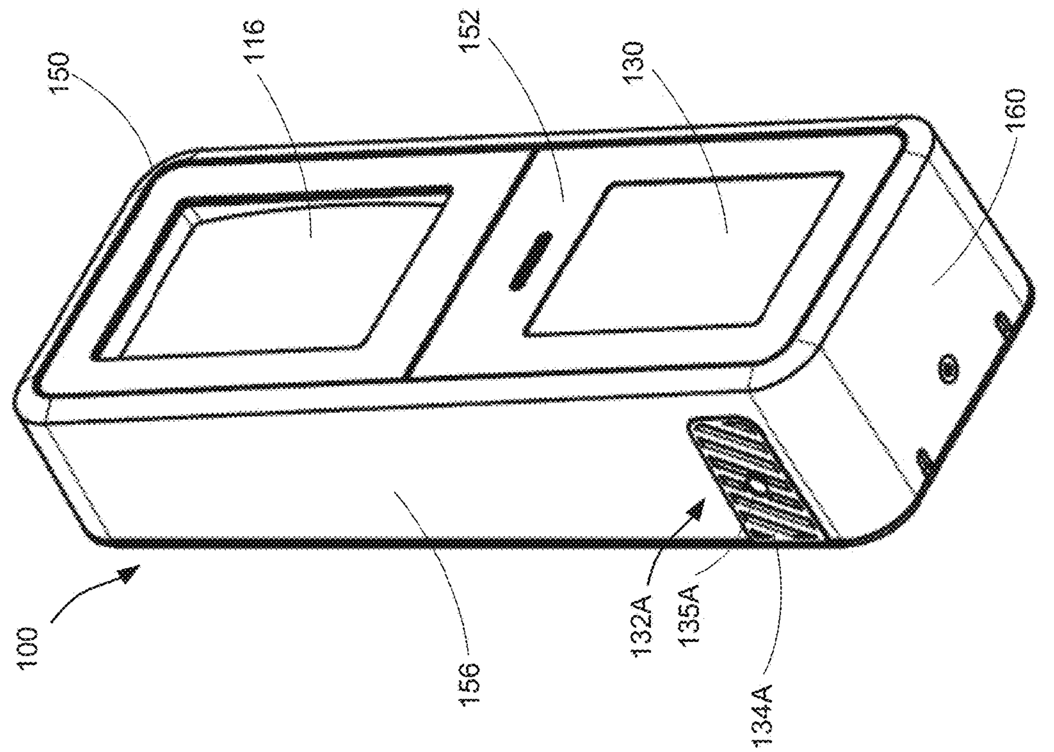
Figure 6:
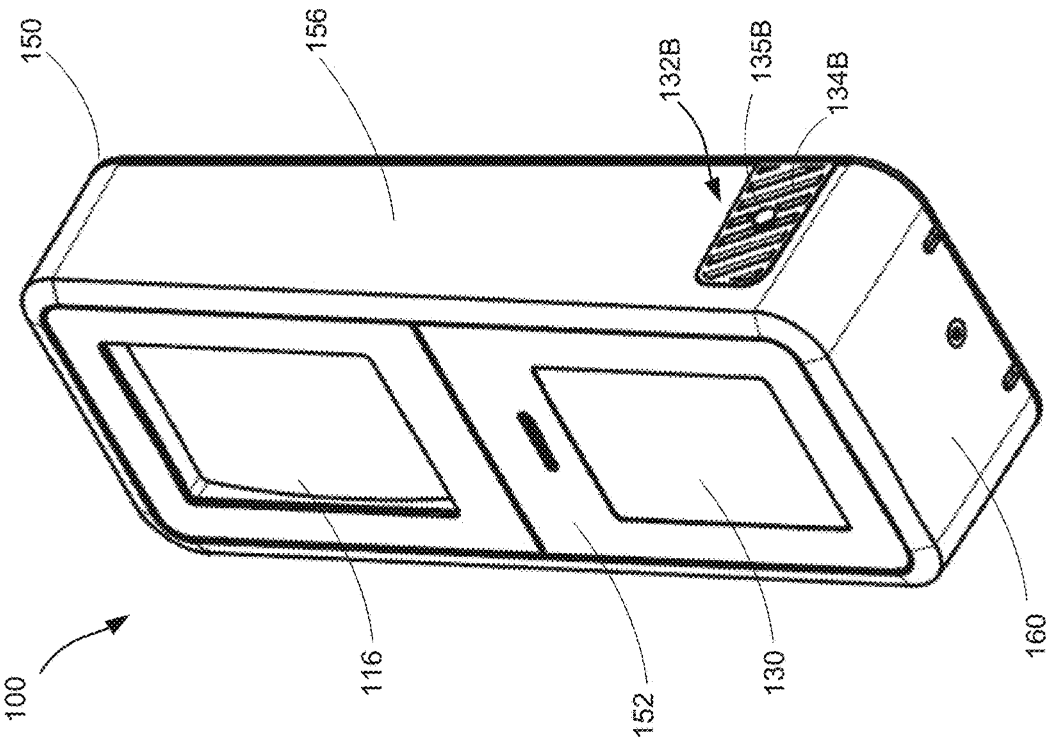
Figure 8:
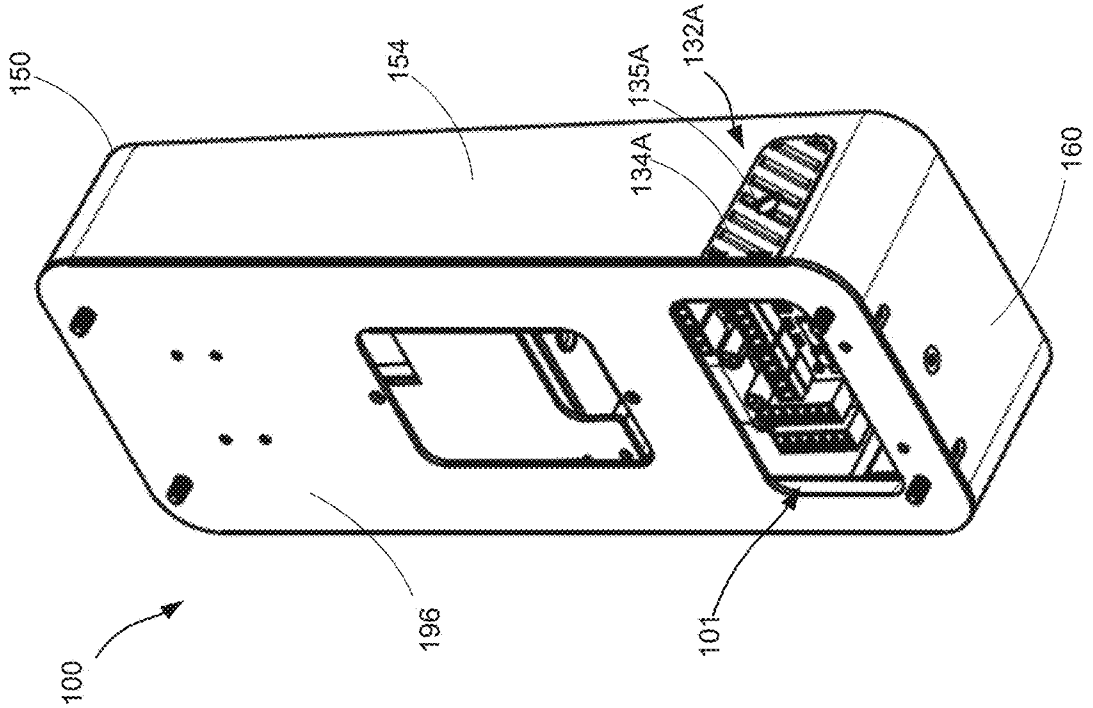
Figure 7:
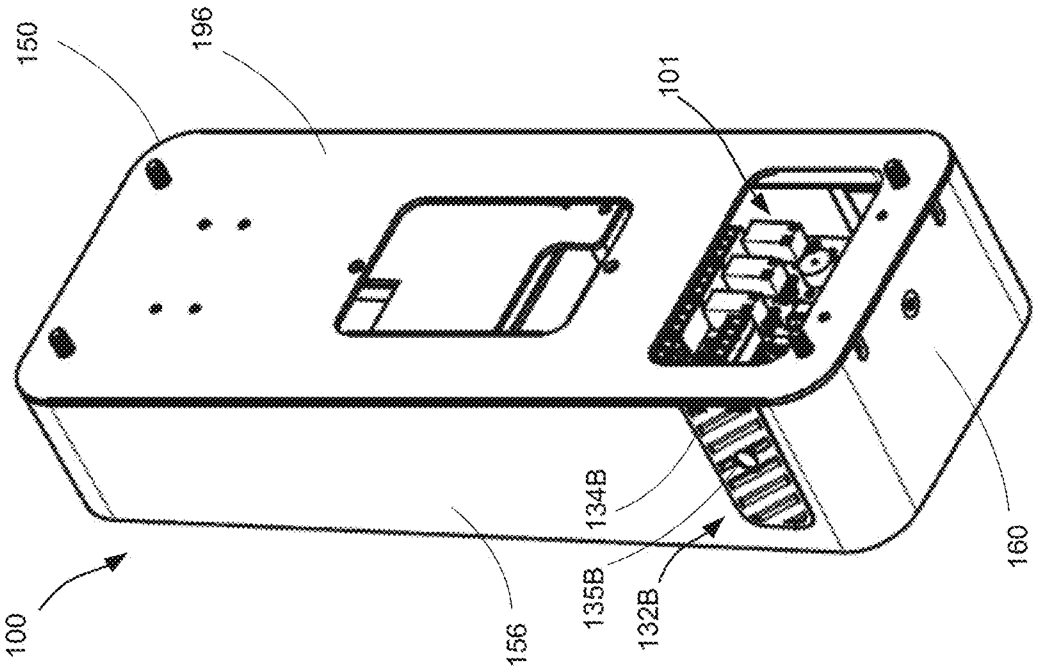
Figure 9:
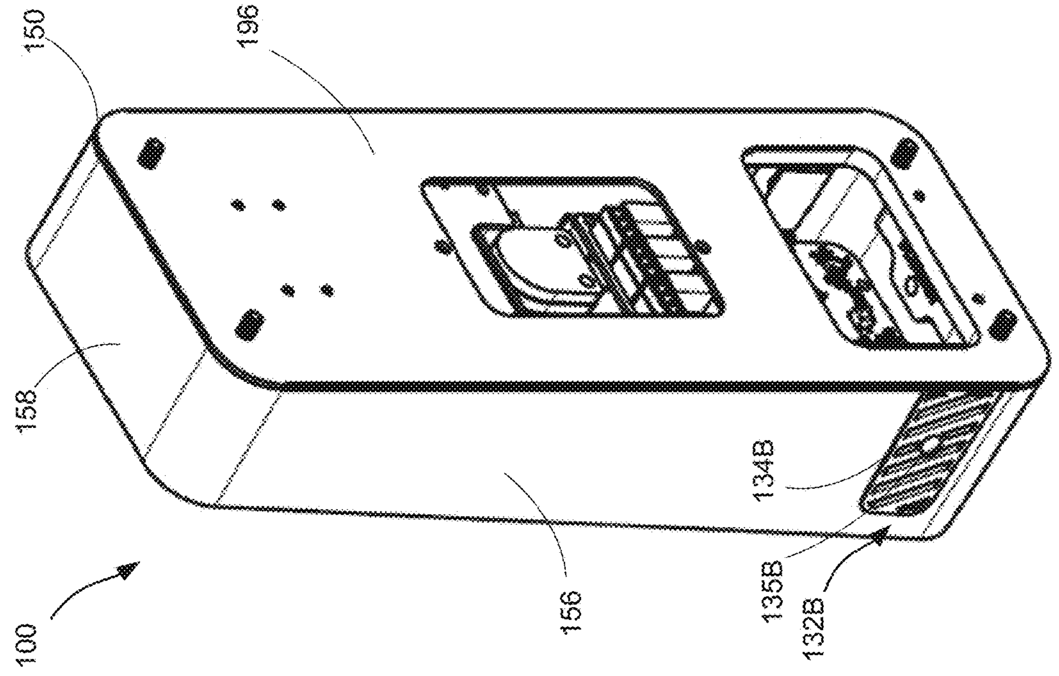
Figure 10:
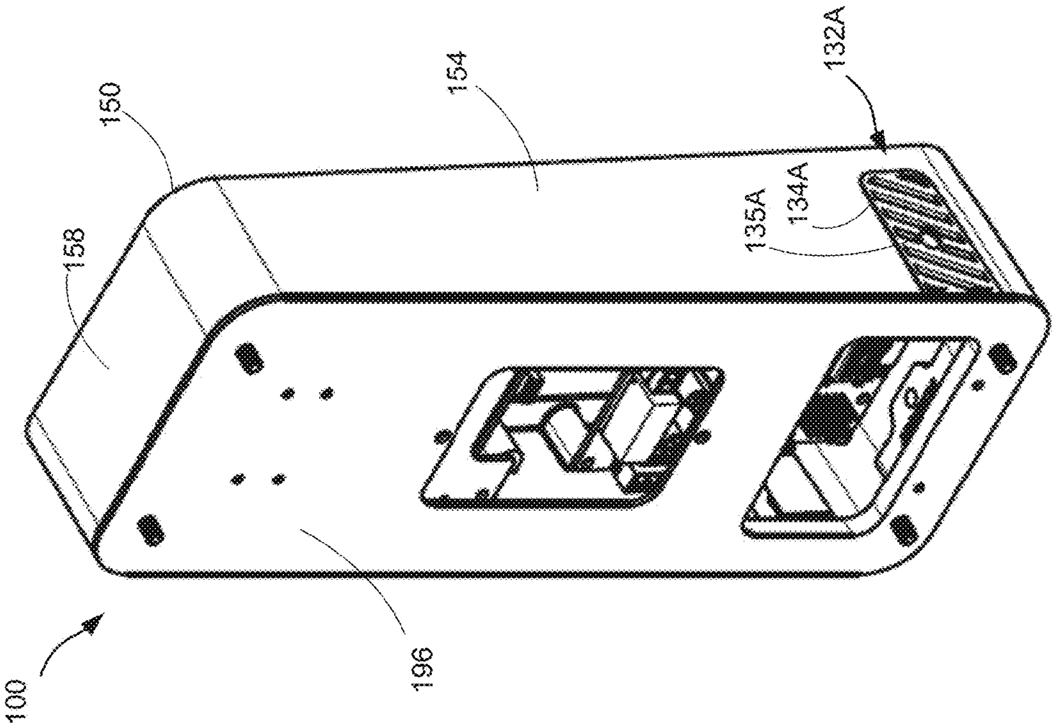
Figure 11:
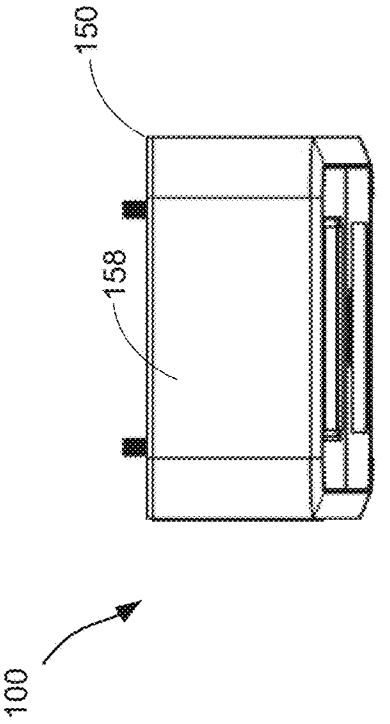
FIG. 11 is a top view of the EVAD of FIG. 1.
Figure 12:
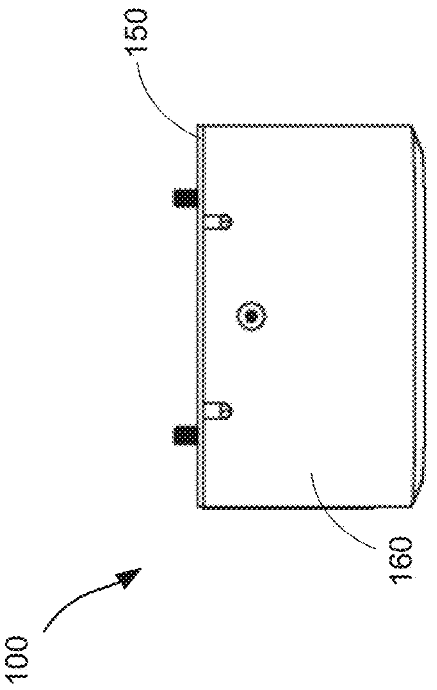
FIG. 12 is a bottom view of the EVAD of FIG. 1.
Figure 15:
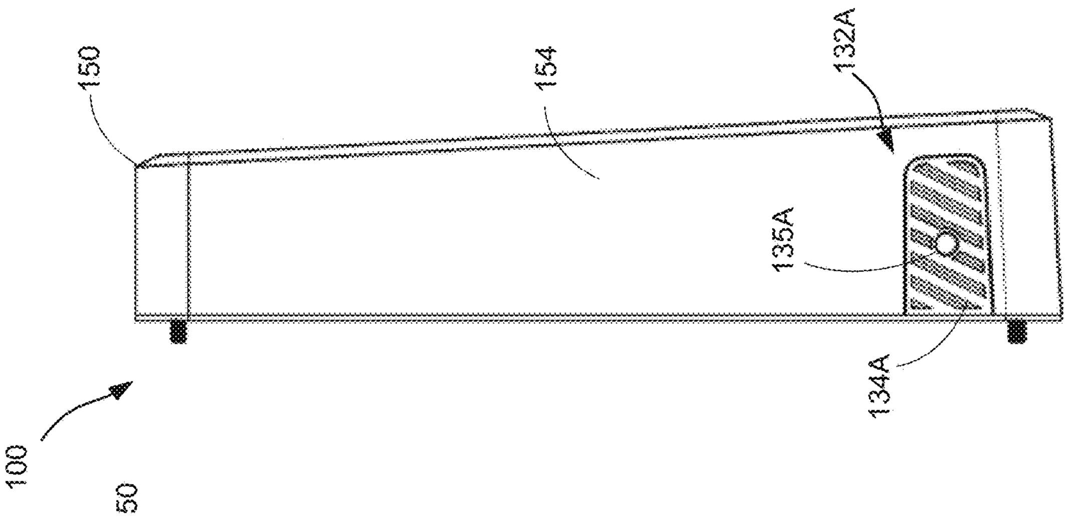
FIGS. 13 and 15 are opposite side views of the EVAD of FIG. 1.
Figure 14:
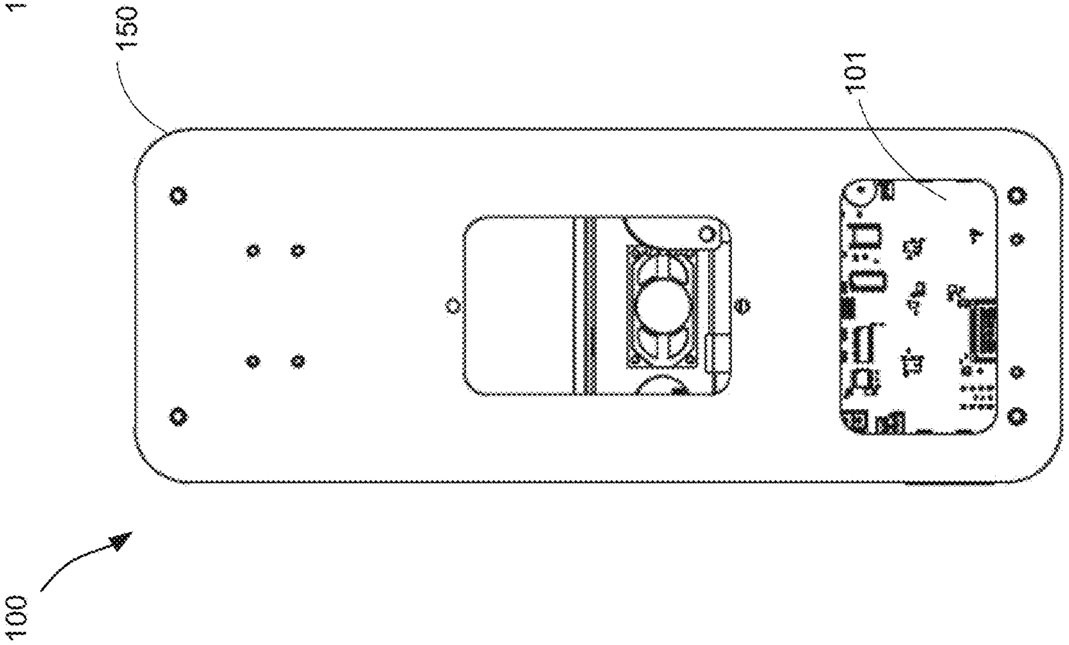
FIG. 14 is a rear view of the EVAD of FIG. 1.
Figure 13:
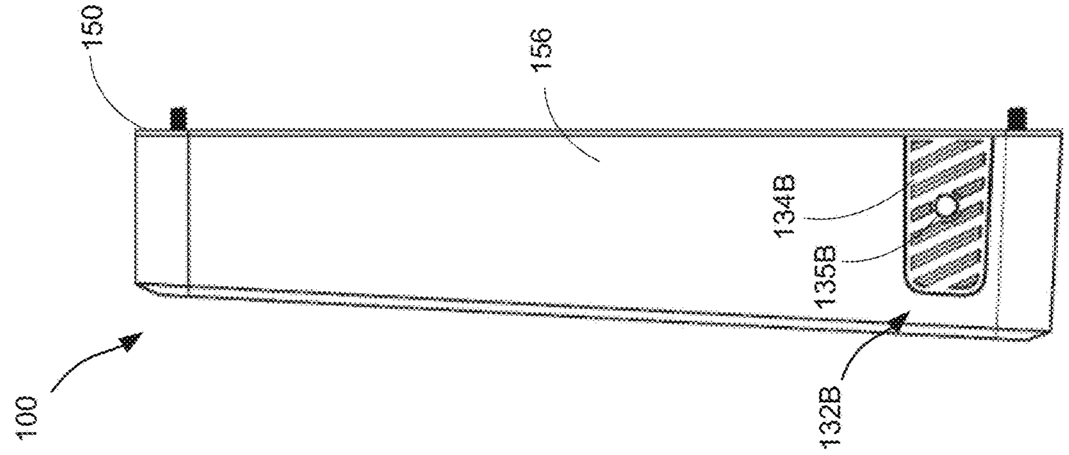

Embodiments of the present disclosure are described in detail with reference to the drawing figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Typically, access control systems include a central controller for the system that communicates with a plurality of basic card readers. The card readers may be mounted to various locations throughout a premises (e.g., a building or dwelling) to receive a user credential (e.g., information on a card of an authorized user) that a user may present to the reader to enter and exit controlled spaces within the premises. The reader will then send the user credential to the central controller of the access control system, and if the central controller recognizes the user credential provided, the user may be allowed access through the entry/exit of the controlled space that the reader is proximate to. However, such readers and access control systems are often severely limited in their capabilities, for example, with respect to their ability to convey different types of information to users, abilities to encourage compliance in providing user credentials to the readers, abilities to detect tampering with the readers and/or forced entry through access points, and abilities to be reprogrammed in a convenient manner.

The present technology describes enhanced visual and audio devices (EVADs) that may be used in access control systems. The EVADs of the present technology provide many advantageous features, including addressing the above described limitations of existing reader, to the access control system and present notable improvements relative to existing readers.

Figure 16:
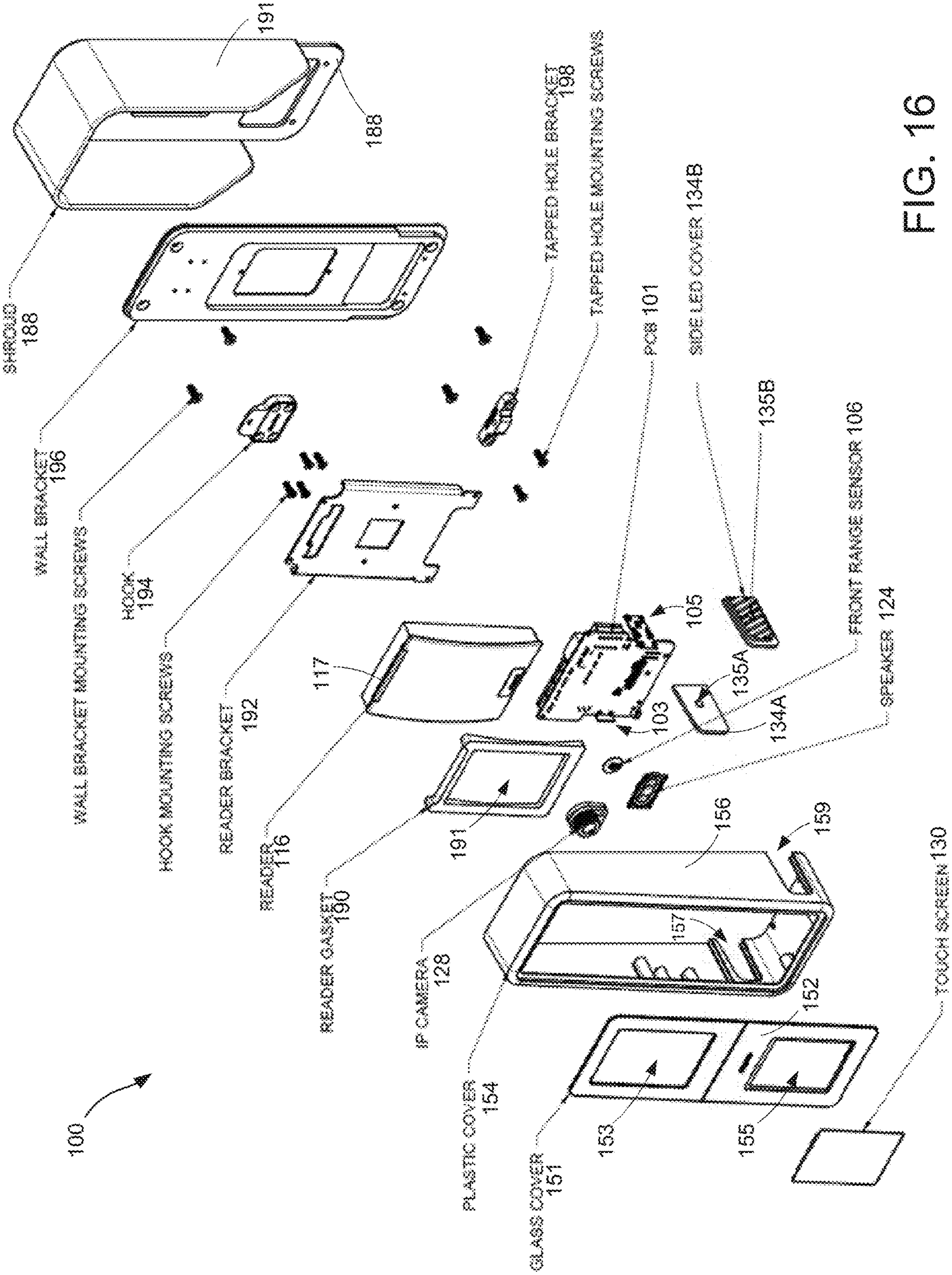
FIG. 16 is an exploded perspective view of the EVAD of FIG. 1.

FIGS. 1-17 illustrate various views of an EVAD 100 accordance with aspects of the present technology. As shown, EVAD 100 includes a housing 150, which includes a front surface or side 152, opposing side surfaces 154, 156, a top end surface 108, and a bottom end surface 160. As shown in FIG. 16, housing 150 may include a front panel or cover 151 and a cover 152, which are coupled to form housing 150. Front panel 151 includes an opening 153 for a reader 116 and an opening 155 for a touch screen 130, which are each at least partially disposed in the interior of housing 150 an accessible through front panel 151 through openings 153, 155. EVAD 100 may include a reader gasket 190, which is disposed between reader 116 an inner facing surface (opposite to the outward facing surface 152) of front panel 151. Gasket 190 includes an opening 191 that is aligned with opening 153.

In one aspect, cover 154 includes slots or notches 157, 159 disposed on sides 154, 156, respectively, for receiving light indicator covers 134A, 134B, respectively. In this way, light indicator covers 134A, 134B are mounted to sides 154, 156 of housing 150.

Housing 150 includes a rear open side (oppositely disposed from front panel 151), which couples with bracket 196. Bracket 196 is configured to receive fasteners (e.g., screws) for mounting EVAD 100 to a surface, e.g., a wall of a premises, such that the rear open side of housing 150 is against the surface. Bracket 192 is configured to receive fasteners (e.g., screws) for mounting reader 116 within the interior of housing 150 to bracket 196 and to the surface (e.g., a wall). Hook 194 and bracket 198 are configured to receive fasteners (e.g., screws) for mounting, in cooperation with brackets 192, 196, the internal components of EVAD 100 to the surface.

Figure 17:
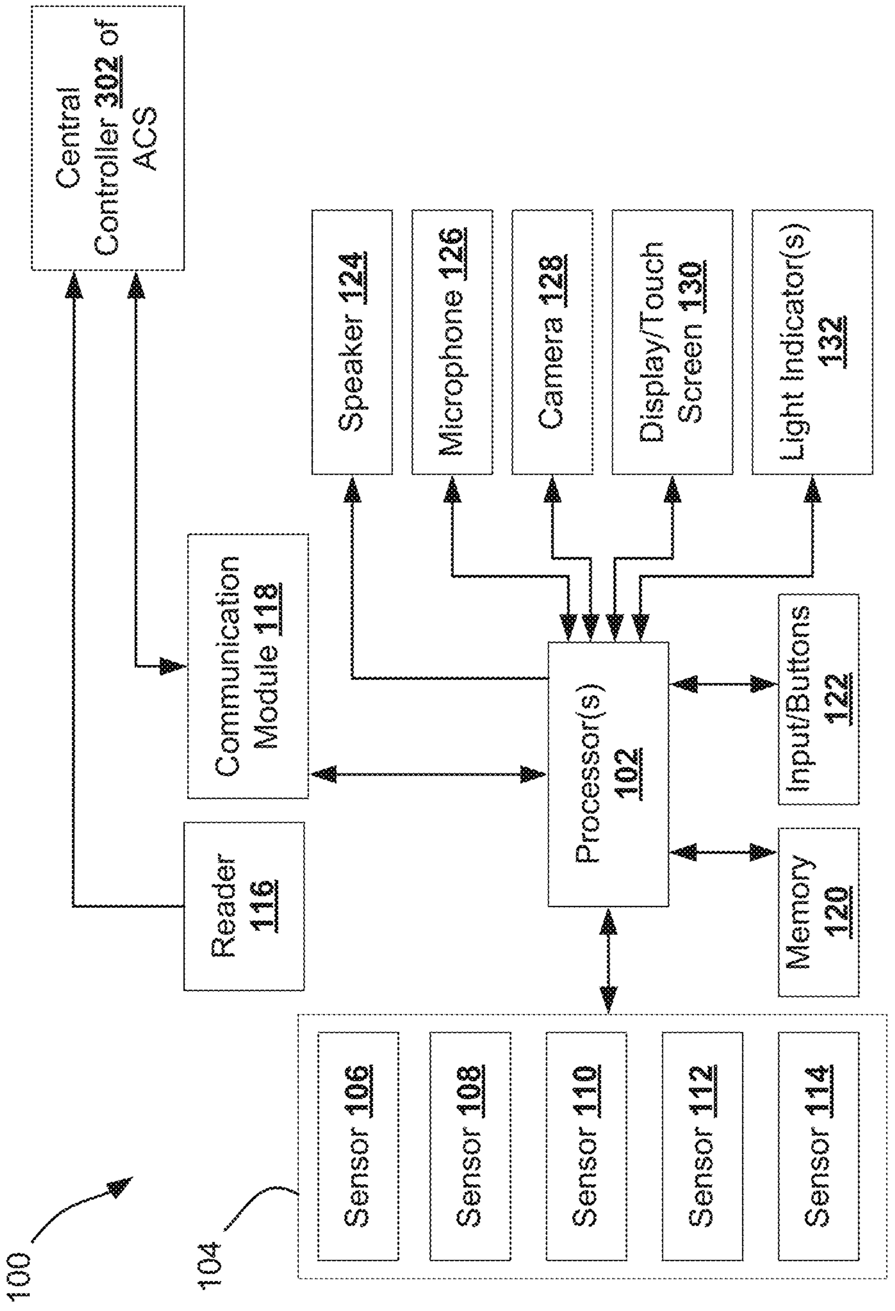
FIG. 17 is a block diagram of several components of the EVAD of FIG. 1.

FIG. 17 illustrates a block diagram of EVAD 100 in accordance with aspects of the present technology. As shown in FIG. 17, in one aspect, EVAD 100 includes one or more processors 102 configured to control operation of the EVAD and its components, one or more sensors 104 (e.g., including sensors 106, 108, 110, 112, 114), reader 116, communication module 118, one or more memory (volatile and/or non-volatile) 120, inputs/buttons 122, speaker 124, microphone 126, camera 128 (e.g., an Internet Protocol camera), display/touch screen 130, and one or more light indicators 132. One or more of the components of the EVAD 100 may be integrated on a printed circuit board 101 (shown in FIG. 16) or coupled to a connector or port of the board 101. For example, in one aspect, one or more of: processor 102, sensors 104, communication module 118, memory 120, buttons 122, speaker 124, microphone 126, camera 128, and/or light indicators 132 may be directly integrated in (i.e., printed on) board 101.

The EVAD 100 may be coupled to an external power supply for receiving and providing power to the components of the EVAD 100. In one aspect, the external power supply is a power supply of a building or structure the EVAD 100 is mounted within and the external power supply is coupled to one or more power regulator circuits of circuit board 101, which regulate the receiving power from the external power supply and distribute it to the components of the EVAD 100.

Figure 18:
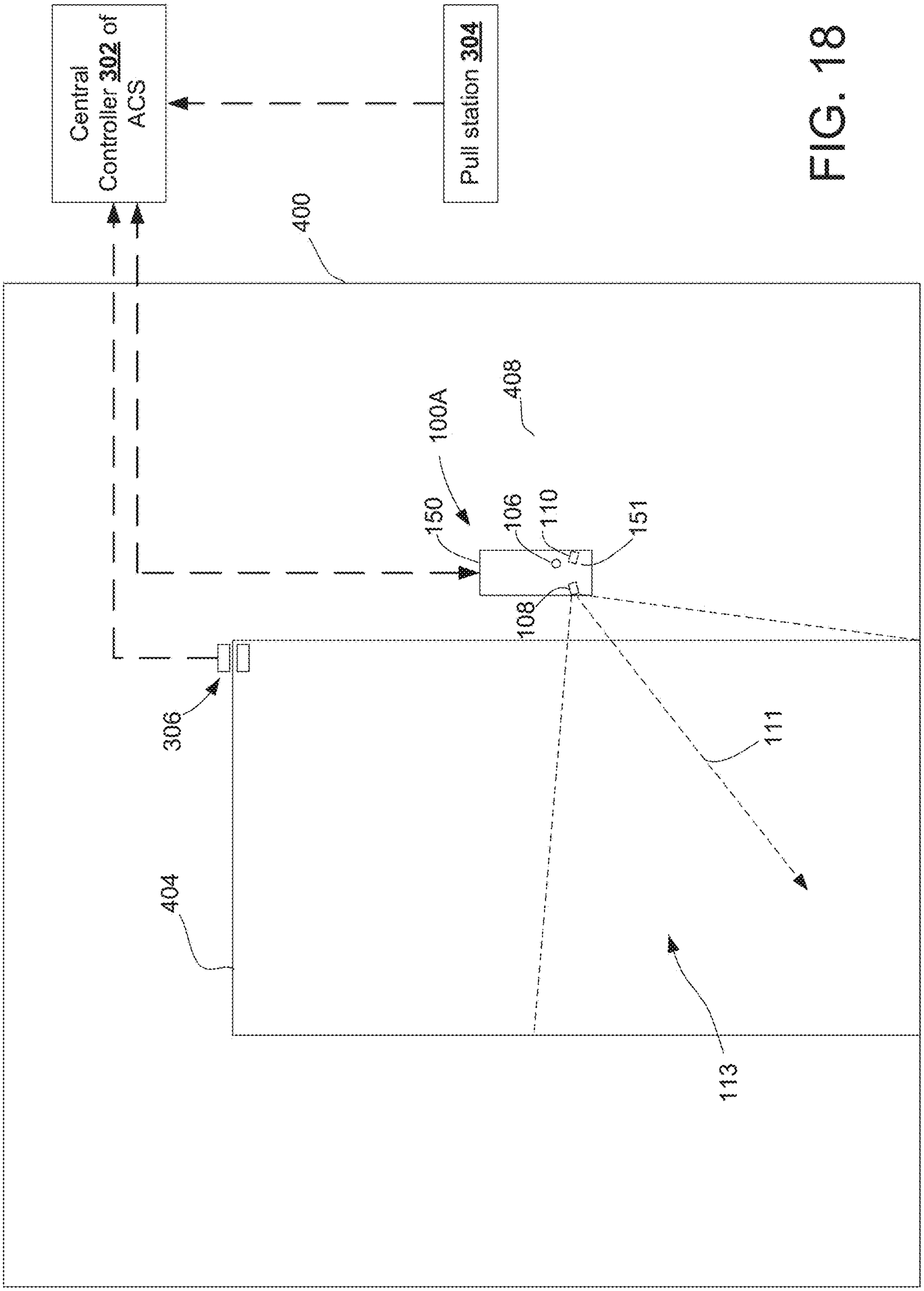
FIG. 18 illustrates the EVAD of FIG. 1 in an access control system environment.
Figure 19:
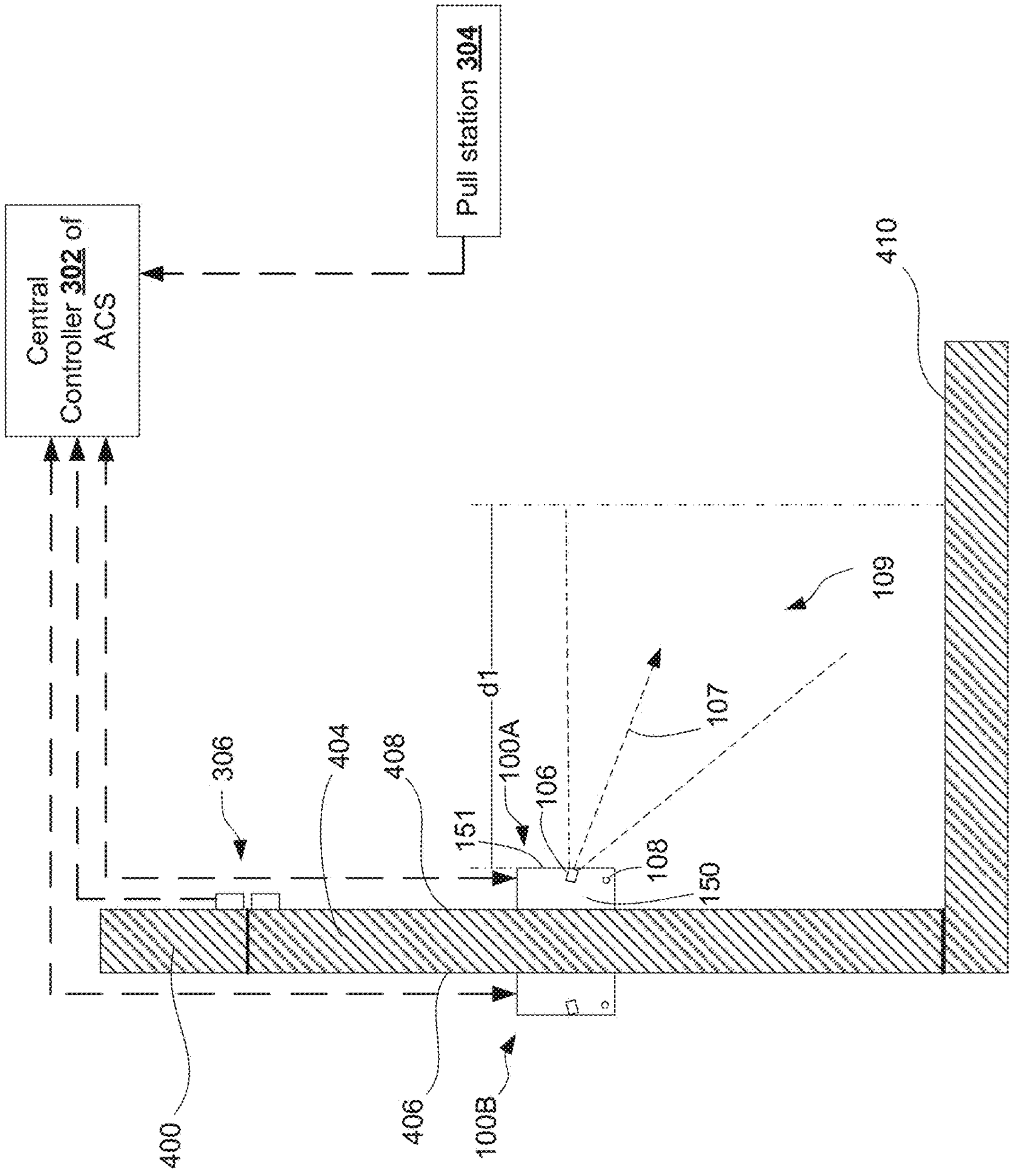
FIG. 19 is a side cross-sectional view of FIG. 18.
Figure 20:
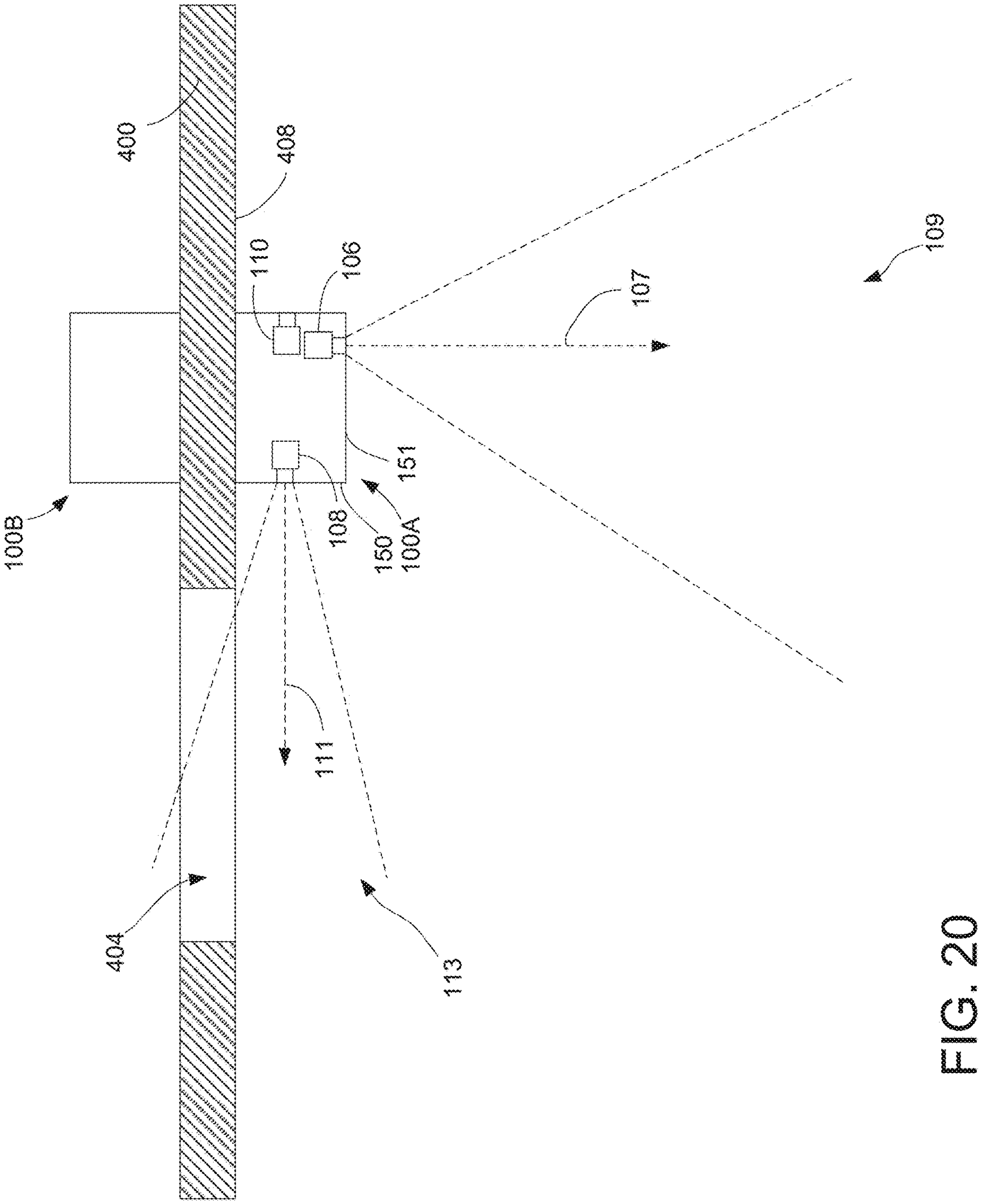
FIG. 20 is a top cross-sectional view of FIG. 18.
Figure 21:
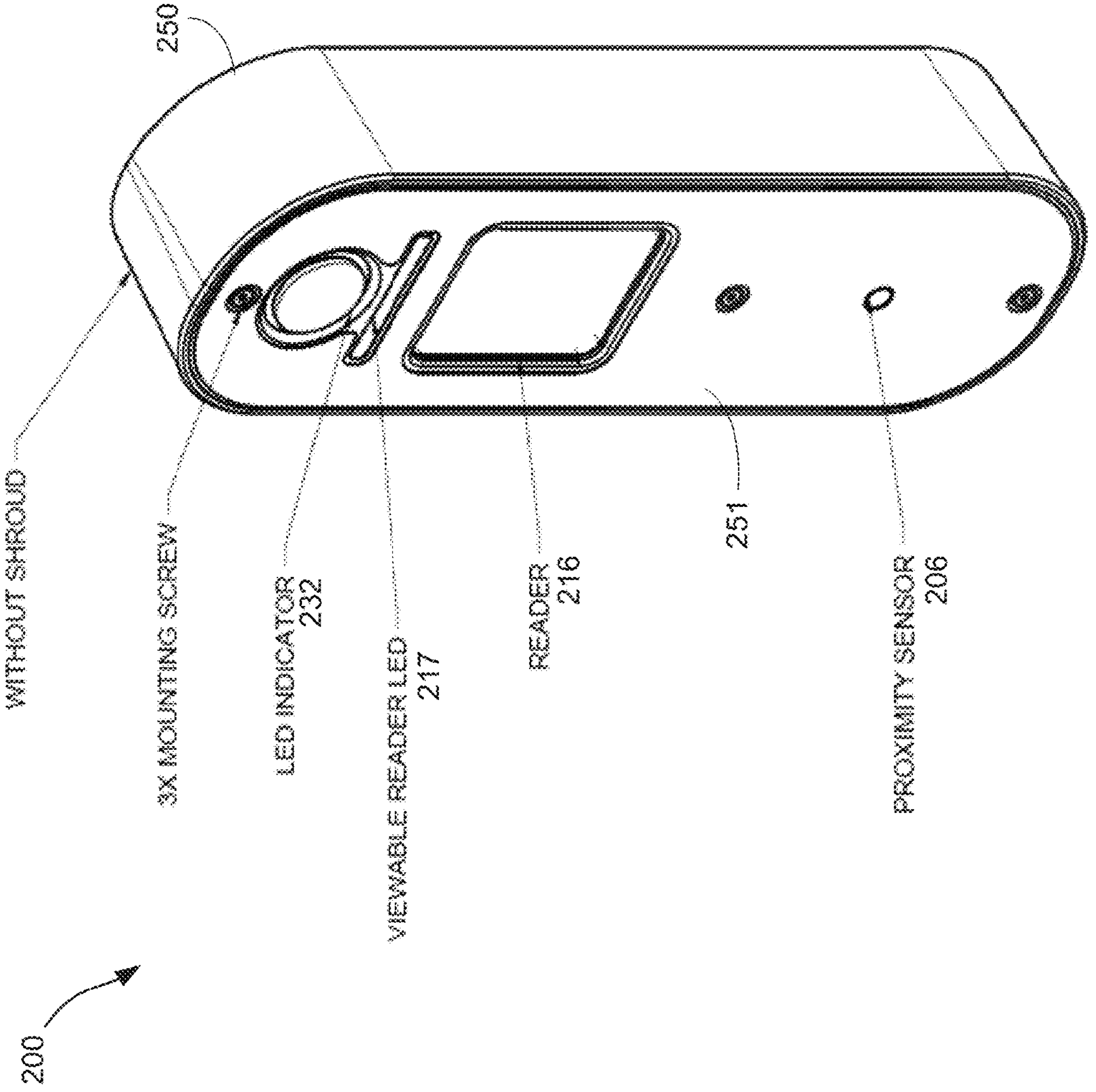
FIG. 21 is a perspective view of another EVAD in accordance with an aspect of the present technology.
Figure 22:
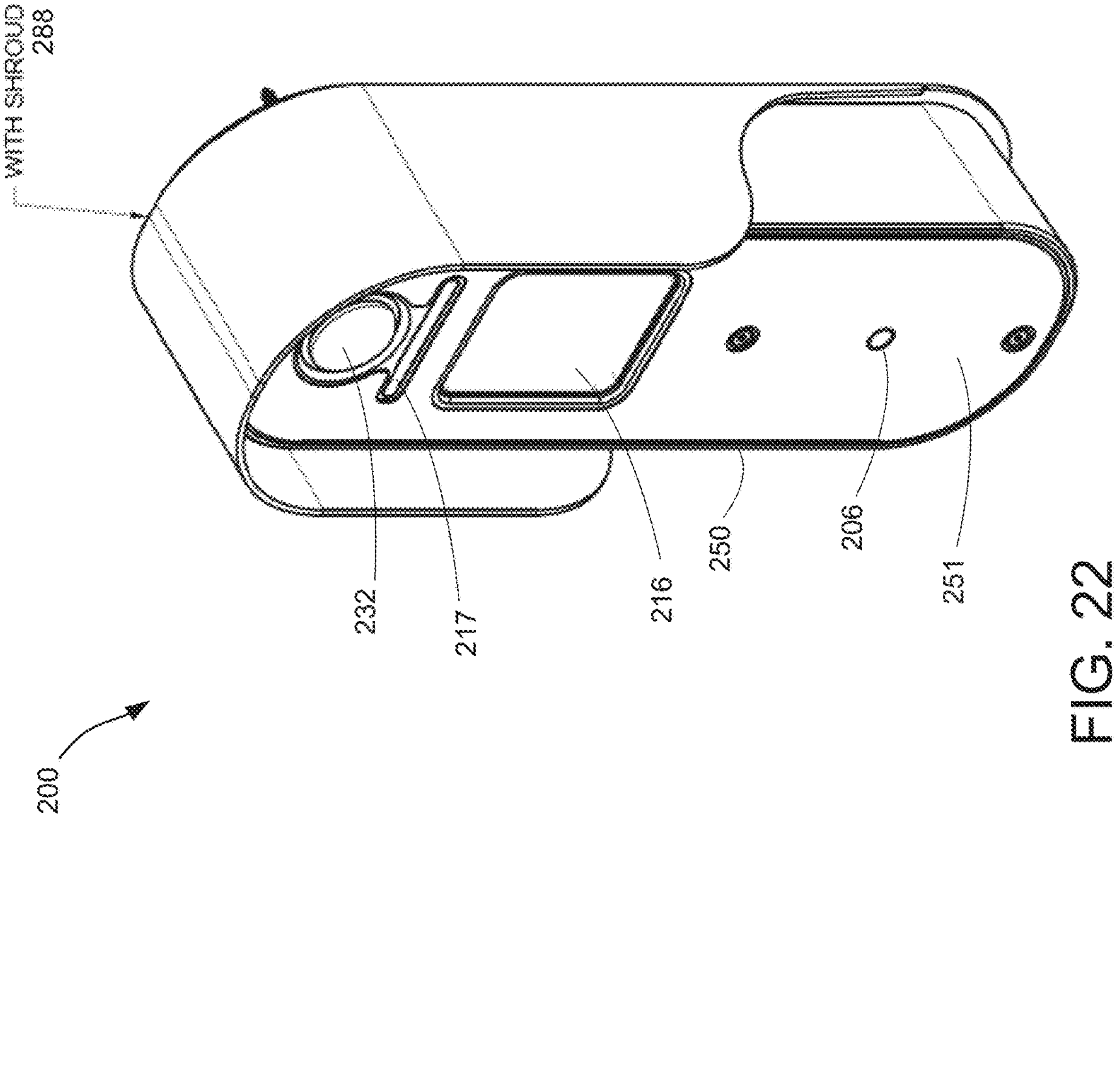
FIG. 22 is a perspective view of the EVAD of FIG. 21 include a shroud in accordance with the present technology.
Figure 26:
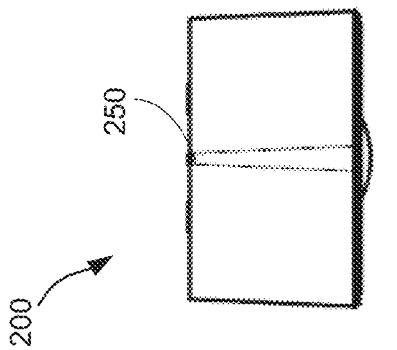
FIG. 26 is a top view of the EVAD of FIG. 21.
Figure 27:
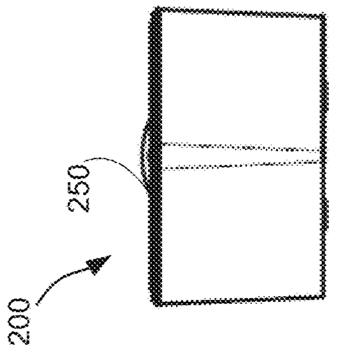
FIG. 27 is a bottom view of the EVAD of FIG. 21.
Figure 25:
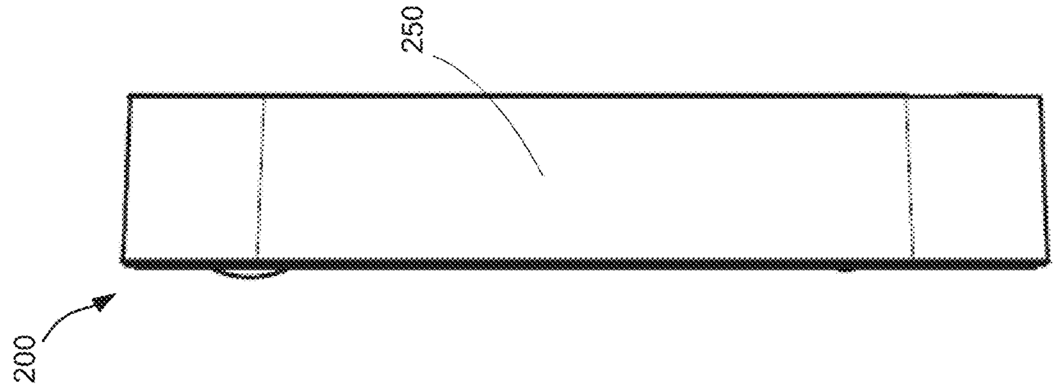
FIGS. 24 and 25 are opposite side views of the EVAD of FIG. 21.
Figure 24:
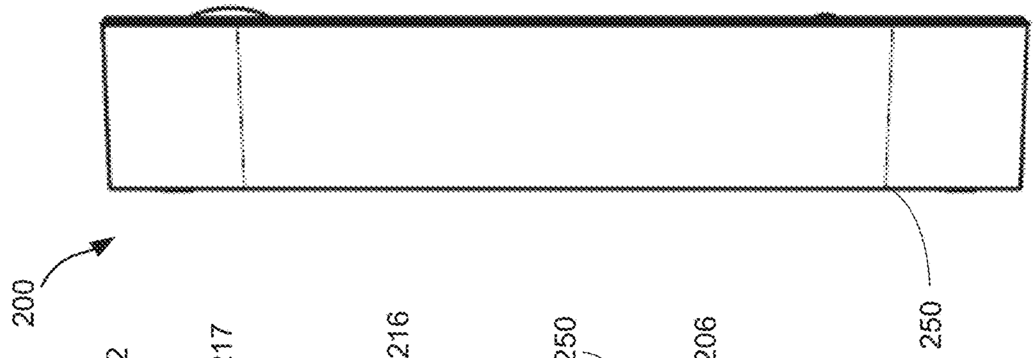
Figure 23:
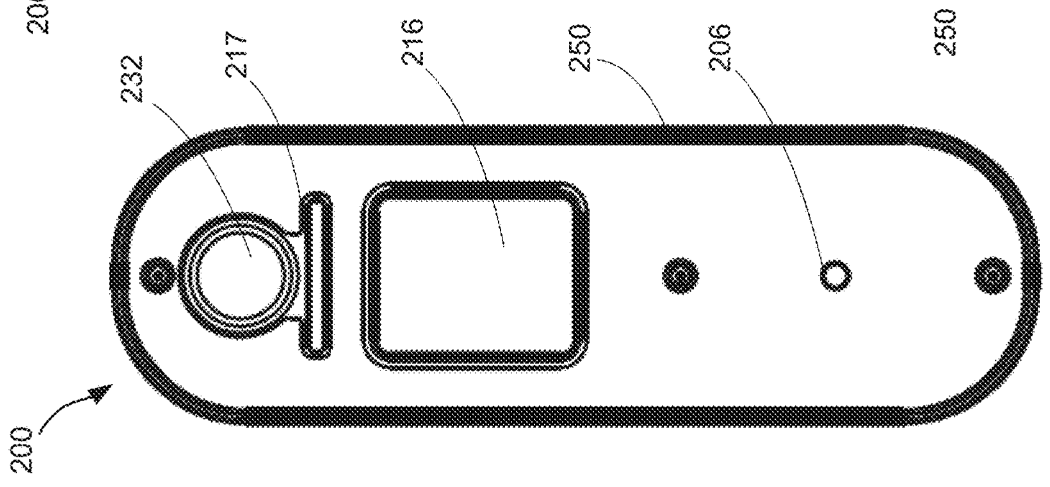
FIG. 23 is a front view of the EVAD of FIG. 21.
Figure 29:
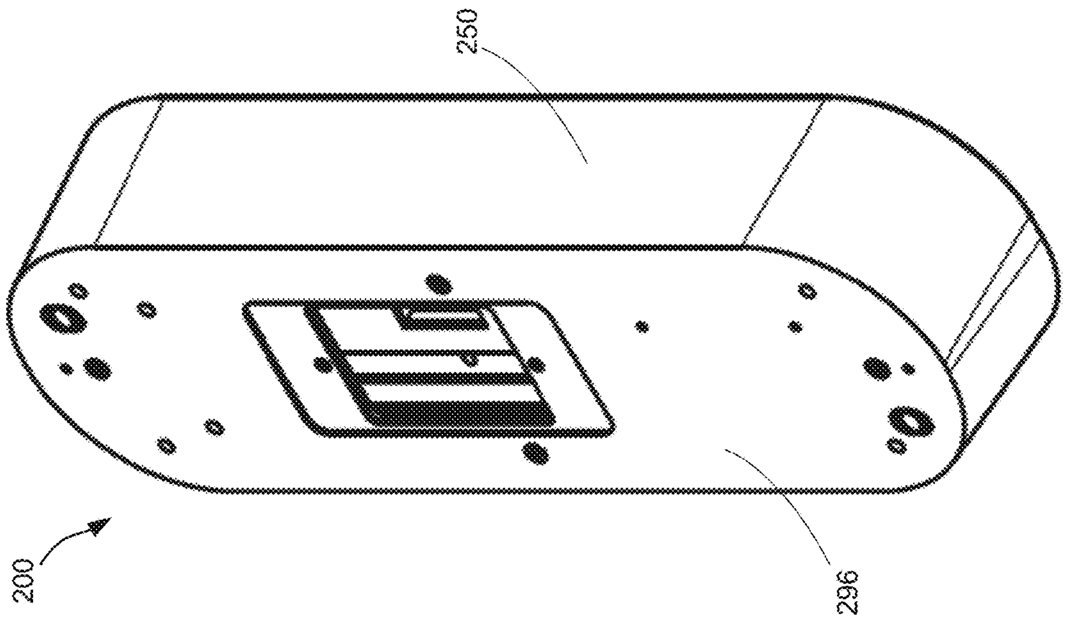
FIGS. 28 and 29 are perspective view of the EVAD of FIG. 21.
Figure 28:
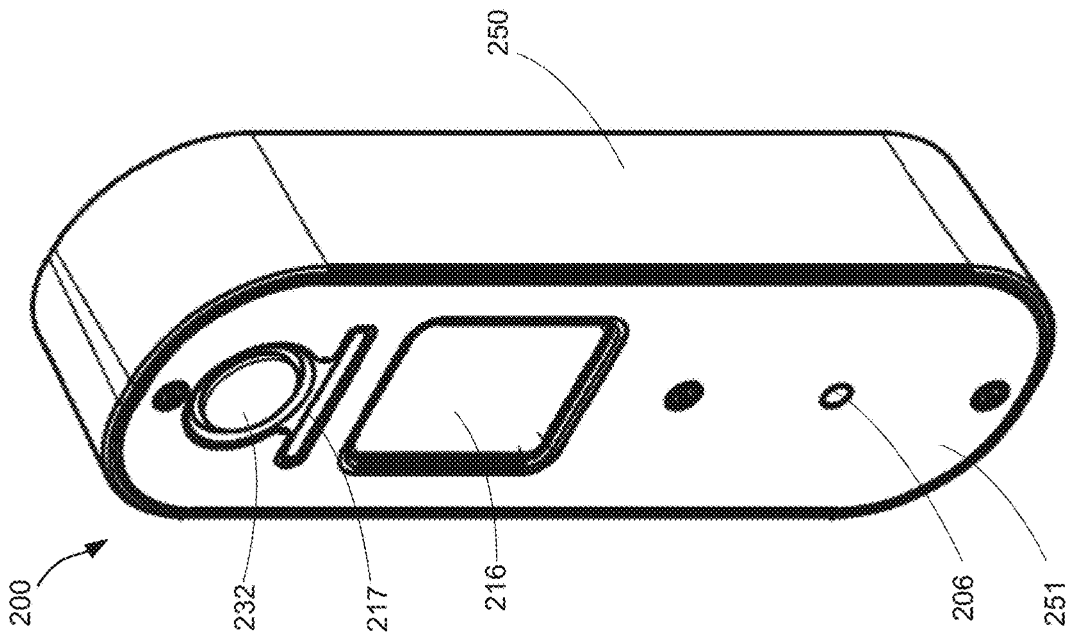

As shown, e.g., in FIGS. 18-20, the housing 150 of EVAD 100 is mountable to a surface 408 of a wall 400 of a premises proximately to an access point 404 of a controlled space within the premises (e.g., an entry, an exit, a door of a structure, building, office, closets, or any other door or access point as one skilled in the art would appreciate). In FIGS. 18-20, the access point is a door 404 in wall 400. As shown, EVAD 100 is communicatively coupled to central controller 302 of the access control system of the premises. In one aspect, communication module 118 is configured to enable communication (e.g., hardwired or wireless over the Internet or other types of networks) by processor 102 (or other EVAD components) with the central controller 302 of the access control system (e.g., disposed at a different location than EVADs 100 and 200) of the system or other computing devices. Alternatively, processor 102 of EVAD 100 may be configured to communicate directly with the central controller 302 of the ACS. In one aspect, communication module 118 is coupled via a hardwired connection to central controller 302 that extends within wall 400 when EVAD 100 is set up and mounted to the surface 408 of wall 400.

As shown in FIGS. 19 and 20, in one aspect, throughout the premises, pairs of EVADs 100A, 100B are mounted proximately to access points of controlled areas, such as doors 404, on both sides of wall 404, such that EVADs 100A, 100B may be used in both directions of operation of the door 404. Each pair of EVADs 100A, 100B is communicatively coupled (e.g., via their communication modules 118) in parallel to central controller 302.

The reader 116 of the EVAD 100 is configured to receive a user credential, e.g., by interrogating a user device, tag or card (e.g., a phone, NFC or RFID chip, card, tag, etc.) including the user credential stored thereon. The reader 116 may be configured for contactless interrogation (e.g., BLE, NFC, RFID, etc.) of the user device, tag, or card. When a user presents their device, tag, or card to within a reading range of the reader 116, the reader 116 is configured to read the user credential and provide the user credential to the controller 302 of the access control system. The reader 116 may be a reader such as iCLASS® SE R40 made by HID® or the iCLASS® RK40 Keypad Reader made by HID®. In some aspects, reader 116 may include a keypad configured to receive, via user input, a user credential that comprises a security or authorization code that is provided to controller 302.

It is to be appreciated that, in some aspects, for security and/or liability purposes, reader 116 is not coupled to processor 102 of EVAD 100 and is instead only in communication with central controller 302, as shown in FIG. 17. However, in other aspects, the reader 116 may be communicatively coupled to processor 102 and may be controlled by and communicate through processor 102 with central controller 302.

In any case, if the central controller 302 of the access control system determines that, based on the user credential provided, the user should be granted access through the access point into or out of the controlled space where the EVAD 100 is mounted, the central controller 302 of the access control system will provide the processor 102 (e.g., via the communication path through communication module 118) with an access granted signal. In one aspect, the processor 102 or controller 302 is configured to generate a signal to cause door 404 of the controlled area to be unlocked in response to receiving an access granted signal.

If the central controller 302 of the access control system determines that, based on the user credential provided, the user should not be granted access through the access point into or out of the controlled space where the EVAD is mounted, the central controller 302 of the access control system will provide the processor 102 (e.g., via the communication path through communication module 118) with an access denied signal.

It is to be appreciated, that where a pair of EVADs 100A, 100B are mounted proximate to the same door 404 or other access point, the EVADs 100A, 100B are communicatively coupled to controller 302 such that the processors 102 of both of EVADs 100A, 100B will receive the access granted or access denied signal regardless of which EVAD 100A, 100B was presented with the user credential initially.

The access control signal and access denied signal is also provided to the reader 116, which may include a light indicator 117 (e.g., one or more LEDs), as shown in FIGS. 2 and 16. The reader 116 is configured to activate indicator 117 such that light in a first color (e.g., green) is emitted if the access granted signal is received or to active indicator 117 such that light in a second color (e.g., red) is emitted if the access denied signal is received from controller 302. In one aspect, front panel 151 may include an opening (not shown) through surface 152 such that the light emitted from reader 116 is visible external to the housing 150 of EVAD 100. In another aspect, front panel 151 may be made of glass and in the region of front panel 151 where indicator 117 is disposed behind, the glass may be transparent such that the light emitted by indicator 117 is visible external to the housing 150 of EVAD 100. It is to be appreciated that some portions of panel 151 other than the portion that indicator 117 is disposed behind may be opaque such that the interior of the housing 150 is not visible.

It is to be appreciated that EVADs 100A, 100B are configured to receive other types of signals from controller 302 (i.e., other than access granted/denied signals).

For example, as shown in FIGS. 18-20, throughout the premises, the access control system may include pull stations 304 disposed at various locations. Pull station 304 may include a lever or other actuation means that when actuated (e.g., pulled, lifted, pressed, etc.) by a user, sends a signal to controller 302. Such pull stations 304 may be intended for use in emergency situations. In response to receiving a signal from pull station 304 indicating pull station 304 has been actuated, controller 302 is configured to send all of the EVADs 100 located throughout the entire facility at all access points an alarm signal.

As another example, some or all of the doors or access points 404 in the facility may include a sensor 306 configured to detect if the door 404 or access point has been forced open such that unauthorized access is granted to the controlled space through the access point. The sensor 306 is configured to detect when forced entry through the door 404 occurs and send a corresponding signal to central controller 302. For example, the sensor 306 may be a door contact sensor configured to detect when a first portion of the sensor coupled to the door 404 and a second portion of the sensor coupled to the wall 400 have been separated, thus breaking the (e.g., magnetic) connection between the first and second portions of the sensor. When the connection is broken, sensor 306 is configured to send a signal to central controller 302. In response to receiving the signal from sensor 306 of a door or access point 404, controller 302 is configured to send both EVADs 100A, 100B a forced entry or forced door type signal indicating that the access point or door 404 is being forced open or there is an attempt to do so.

As will be described below, processor 102 of the EVAD 100 is configured to output or provide one or more different types and/or combinations of notifications to communicate information to the user associated with the type of signal received from controller 302 through the enhanced visual and audio components of the EVAD 100. The different types of notifications outputted by EVAD 100 are based on receiving different types of signals from the controller 302 of the ACS system, such as, but not limited to, the different types of signals described above.

EVAD 100 may include a multitude of visual and audio input/output components for communicating and receiving information when a user uses EVAD 100 and/or EVAD 100 receives signals from controller 302.

For example, in one aspect, EVAD 100 includes a touch screen display interface or screen 130 configured to display a graphical user interface (GUI) that is generated by processor 102 that includes a plurality of screens, menus, and selectable features. The touch screen display 130 may receive user input (e.g., via the user touch interaction with the display) from the user. Moreover, the display 130 is configured to display different colors, texts, and images responsive to certain trigger events (e.g., based on signal types received from controller 302 and/or other events detected by processor 102 of EVAD 100). In one aspect, the touch/display surface of the touch display 130 is disposed on the front facing panel 151 of the EVAD housing 150.

In some aspects, EVAD 100 includes one or more light indicators 132 that are controllable by processor 102. The light indicators 132 may comprises one or more LED lights. The light indicators 132 may be selectively controlled by processor 102 to display a plurality of different colors based on different triggering events that may occur. The color emitted by the indicator lights 132 may be synchronized with and mirror the color of the light emitted by the background of display 130 and/or the color light emitted by reader indicator 117.

In one aspect, first and second light indicators 132 may be disposed on side surfaces 154, 156 of housing 151 such that the light emitted by the first and second indicators 132 is visible to users from a plurality of angles. Thus, in combination with the light emitted by the background of display 130 (and/or the light emitted by indicator 117 of reader 116), EVAD 100 is configured to emit light indicating specific events from front and side surfaces 152, 154, 156 of housing 150, such that the light is viewable from a plurality of angles when EVAD 100 is mounted to wall 400.

For example, as shown in FIGS. 3-10, the EVAD 100 may include a first light indicator 132A and a second light indicator 132B disposed on surfaces 154, 156, respectively and configured to emit light from each of surfaces 154, 156. In one aspect, each light indicator comprises one more light sources (e.g., LEDs) and a cover 134. The light source of each indicator 132 may be disposed on circuit board 101 within housing 150 and controllable by processor 102. For example, as shown in FIG. 16, the light source(s) for light indicator 132A may be disposed on a portion 103 of circuit board 101 such that the light sources are arranged adjacent to light cover 134A within housing 150. The light source(s) for light indicator 132B may be disposed on a portion 105 of circuit board 101 such that the light sources are arranged adjacent to light cover 134B within housing 150. When the light sources of each indicator 132A, 132B are activated, light is emitted through respective light covers 134A, 134B toward the exterior of the EVAD 100 in opposite directions for surfaces 154, 156. In this way, if the EVAD 100 is mounted to a wall 400 and a user is to the left or right (as viewed from the front panel surface 152), e.g., walking down a hallway toward the EVAD 100 mounted to the wall 400 adjacent to a door 404 of the hallway, the light from at least one of the indicators 132A, 132B will be visible to the user.

In one aspect, as described above, the processor 102 is configured to control the indicators 132A, 132B and the background color of the display screen 130 to display/emit the same color simultaneously based on the triggering event detected such that a light indication that is indicative of the event that has occurred is viewable from a plurality of different angles of the EVAD such that there is a higher chance of a user being notified of the event.

In one aspect, EVAD 100 includes a speaker 124 that is controllable by processor 102. The processor 102 controls the speaker 124 to play different sounds or tones (e.g., an alarm sound, a buzzer, a tone) and/or a pre-recorded audio file. The different sounds may be stored in memory 120 of the EVAD 100 and/or may be received by the processor 102 in a communication, e.g., from the central controller 302 of the access control system. In one aspect, the speaker 130 may include a microphone 126 such that the speaker 130 is configured to support two-way communication such that a user proximate to the EVAD 100 may communicate with a remotely located user using a device or system (e.g., the central controller 302 of the access control system or another device or system) that is in communication with the EVAD 100 (e.g., through module 118). In another aspect, the microphone 126 may be a discrete component from speaker 130 that is controllable by processor 102.

Although not shown, in some aspects, EVAD 100 may include one or more physical buttons 122 (e.g., a number pad, arrow keys, or other selectable buttons) in addition to the display 130 for receiving user input to be provided to processor 102. The physical buttons 122 may be disposed on the front panel 151 of housing 150. In another aspect, the display 130 may be a standard display without ability to receive touch and the buttons 122 are used to navigate the GUI on the display 130 and otherwise interact with the EVAD 100.

In one aspect, EVAD 100 includes tamper detections features, such as detection of a change in distance between the EVAD 100 and the surface 408 of the wall 400 the EVAD 100 is mounted to and/or a change in the orientation of the housing 150 of the EVAD 100. The processor 102 is configured to monitor if any tamper detection from a plurality of different tamper detection types (e.g., distance and/or tilt) is detected and trigger an alarm condition. In one aspect, when the alarm condition is triggered, the processor 202 is configured to send one or more signals (e.g., via communication module 218) to controller 302 of the ACS and control one or more audio/visual outputs of speaker 124, display 130, and/or light indicators 132 to indicate that the EVAD has been tampered with.

In one aspect, the EVAD includes one or more tamper detection sensors, such as, sensors 112, 114 shown in FIG. 18. For example, in one aspect, sensor 112 is configured to detect changes in distance between the EVAD 100 and the surface 408 of the wall 400 the EVAD 100 is mounted to. This may be indicative of an attempt to remove the EVAD from the wall 400 to gain unauthorized access to the interior of the EVAD 100 or the wall 400 behind the EVAD 100.

In one aspect, the tamper detection sensor 112 is in communication with the processor 102 such that the processor 102 can monitor the state changes of the sensor 112 and trigger an alarm condition if a tamper condition is detected based on signals front the sensor 112. The alarm condition may comprise the processor 102 providing one or more signals to the central controller 302 of the access control system that an attempt to tamper with the EVAD 100 has been detected, triggering an alarm sound via speaker 130 and/or activating one or more lights of the EVAD (from the display 130 and/or the indicator lights 132), and/or display a particular message on the display 130.

In one aspect, the tamper sensor 112 may be one or more optical switches or optical sensors. The optical sensors are configured to measure a distance between the optical sensor that is mounted to the EVAD 100 (e.g., internal to the housing and directed toward the wall 400) and the wall 400 that the EVAD 100 is mounted to. If the distance between the optical sensor 112 and the EVAD 100 changes by more than a predetermined amount (or changes at all in some aspects), then the processor 102 is configured to trigger the alarm condition. In one aspect, the sensor 112 comprises first and second optical sensors or switches disposed at different locations between the EVAD 100 and the wall 400 the EVAD 100 is mounted to and the processor 102 of the EVAD 100 is configured to trigger an alarm condition if either (or both) of the optical sensors 112 detect a change in distance beyond a predetermined amount (or a change in distance at all). In one; aspect, EVAD 100 may include a single optical sensor 112.

In one aspect, the tamper detection features include tilt detection of the EVAD 100. For example, in one aspect, the EVAD may include at least one tilt detection sensor 114 (e.g., a gyroscope or an accelerometer disposed interior to or on a portion of housing 150). If processor 102 determines that the tilt detection sensor 114 has detected a tilt of more than a predetermined amount (e.g., 2° tilt change), then the processor 102 is configured to trigger the alarm condition.

In one aspect, the EVAD 100 includes both the distance sensor 112 and tilt sensor 114.

In one aspect, when the EVAD 100 is first mounted to the wall 408, a technician may select a calibration button, e.g., on the circuit board 101 of the EVAD 101 for calibrating the sensors 112, 114. In this aspect, after the calibration button is selected, the processor 102 is configured to determine the initial distance measured by the distance sensor 112 between the EVAD 100 and the wall 408 and the initial orientation of the EVAD measured by the tilt detection sensor 114. These measurements will form a baseline for the position of EVAD 100 and may be stored in memory 120 for reference by the processor 102. If processor 102 determines that the distance of the EVAD 100 has changed from the baseline position and/or the orientation of the EVAD 100 has changed from the baseline position, processor 102 is configured to trigger the alarm condition. As described above, the alarm condition may comprise the processor 102 causing one or more of the following to occur: displaying a message on display 130, causing a sound or audio file to be played by the speaker 124, illuminating indicator lights 132A, 132B of the EVAD 100 (e.g., by selectively controlling the background color/output of the display 130 and/or the color/state of the indicators 132A, 132B of the EVAD), and/or sending a signal indicative of an alarm condition to the central controller 302 of the access control system.

In one aspect, EVAD 100 includes one or more proximity or range sensors 106, 108, 110. Sensors 106, 108, 110 are described in greater detail below.

As shown in FIGS. 2 and 16-20, in one aspect, sensor 106 is disposed interior to housing 150 against or proximate to an interior portion of panel 151 with a sensing surface of the sensor 106 oriented toward the exterior of the EVAD 100 through surface 152 of the front panel 151.

In one aspect, front panel 151 includes an opening in surface 152 for the sensing surface of the sensor 106. In this aspect, the sensor 106 may be an infrared sensor, such as a passive infrared sensor (PIR) that detects motion over a predetermined range of distance.

In another aspect, panel 151 is made of glass (or another transparent material) and does not include an opening for sensor 106. In this aspect, the sensor 106 is concealed interior to the EVAD 100 behind the glass and, in the location of the sensing surface of the sensor 106, the glass of the panel 151 is transparent and configured to allow light from the exterior of EVAD 100 to pass through the panel 151 and be received by the sensor 106 to detect motion. In this aspect, the sensor 106 may be an optical range sensor and the sensor surface may be an optical lens. This aspect may have the advantage that the sensor 106 is concealed by the panel 151 to prevent tampering with the sensor 106 and to at least partially camouflage the sensor 106 within the housing. The sensor 106 may also be protected from damage if concealed in this manner. The sensor 106 may be mounted to the circuit board 101 and coupled to processor 102.

As shown in FIGS. 19 and 20, sensor 106 is configured to detect movement that occurs within a predetermined distance dl of the EVAD in an area exterior to the front panel 151. Movement detected within the area is indicative of a user approaching the front panel 151 of EVAD 100 and/or door 404. As shown, the sensing surface of the sensor 106 is oriented in a direction 107 toward the exterior of front panel 151 and away from wall 400. In one aspect, direction 107 may also face toward the floor or ground 410 in addition to facing away from front panel 151 and wall 400. The area exterior to the front panel 151 that the sensor 106 can detect motion within is defined by the field of view 109 (which may be characterized as a cone shown in FIGS. 19 and 20 that is expanding from sensor 106) of the sensor 106. The field of view 109 and distance dl that the sensor 106 can sense movement within can be adjusted in several ways to enable detection of a person approaching EVAD 100 and/or door 404. For example, the physical orientation of the sensor 106 can be adjusted. For sensors, such as optical sensors, that enable digital adjustment, the direction 107 may be adjusted digitally without physically tilting the sensor 106. Moreover, the sensor 106 may enable adjustment (e.g., by actuating a dial of the sensor or sending a signal to the sensor) to the distance dl. In any case, the sensor 106 is configured such that the field of view 109 of the sensor 106 encompasses an area exterior to front panel 151 that a user will traverse through when the user approaches and attempts to pass through door 404.

Sensor 106 is configured to output a signal indicative of the movement to processor 102. In response to receiving the signal from the sensor 106 indicating detected movement, the processor 102 is configured to cause one or more of the light indicators 132, the display 130, and/or the audio speaker 124 to output visual and/or audio indication(s) for a user to present a user credential (such as a badge, token, card, etc.) to the reader 116 of the EVAD 100 prior to passing through the access point or door 404 that the EVAD 100 is mounted proximately to.

For example, responsive to receiving a signal from the sensor 106, the processor 102 may be configured to cause one or more of the following:

a. the light indicators 132A, 132 B to flash light in a predetermined color (e.g., red, blue, yellow, orange, etc.) and a predetermined number of times (e.g., flash/ blink the color three, four, five times, etc.) or hold the color emission constant for a predetermined period of time, b. the display 130 to display a previously stored message (e.g., stored in memory 120) indicating to the user to present a user credential (e.g., display, "please swipe out") with a background color in the predetermined color (e.g., matching the color of the light indicators 132), and/or c. the speaker 124 to play a tone and/or a previously stored audio file (e.g., stored in memory 120) with a recording indicating to the user to present a user credential.

In one aspect, the predetermined distance D1 that the sensor 106 is configured to detect movement within is selected (i.e., by configuring the sensor 106) to be a distance that, when a user is approaching a location the EVAD 100 is mounted to, the EVAD 100 will output the indication(s) to the user to present the user credential to the reader 116 (i.e., to "badge out") before the user has an opportunity to exit the door 404 (i.e., the door is beyond the user's reach and some time (e.g., 1 or 2 seconds), will elapse before the user reaches the door 404). In this way, there is a period of time before the user may go through a door without presenting the user credential to the reader 116 of the EVAD 100 that the EVAD will have the opportunity to output the indication to the user to present the user credential. Thus, the proximity detection feature using sensor 106 may advantageously reduce the number of instances that users will exit a premises through an access point or door 404 without presenting their user credential to reader 116 of EVAD 100 by providing a reminder just before the user exits through door 404. At the same time, for doors that, by law, are not permitted to be locked to disallow user exit (e.g., due to the possibility of a fire, etc.), the EVAD 100 provides a means for encouraging compliance with the request to provide the user credential before exiting through the door. In one aspect, the predetermined distance is in a range of about 2-3 feet, however other distances for implementing the feature are within the scope of the present technology.

It is to be appreciated that, although sensor 106 is shown in the figures and described above as being disposed interior to housing 150, in other aspects of the present technology, sensor 106 may be placed at other locations (e.g., exterior to the housing 150, at the top 108, bottom 160, etc.) of EVAD 100 and directed to the above described area in front of the exterior of the EVAD 100 to detect movement such that processor 102 outputs notification(s) for the user to present their user credential to reader 116.

It is to be appreciated that although sensor 106 is described above as being a PIR or optical proximity sensor, in other aspects of the present technology, sensor 106 may be any other suitable type of proximity sensor for sensing movement within a predetermined distance.

EVAD 100 may further include a proximity or range sensor on one or both sides of housing 150 and directed in an area proximate to and/or encompassing door 404 to detect movement indicating user entry or exit through door 404.

For example, EVAD 100 may include proximity or range sensors 108, 110 disposed on or proximate to sides 154, 156, respectively, of housing 150. Sensors 108, 110 may be a PIR, optical, or other type of proximity or range sensor configured to detect movement within a predetermined distance. Each sensor 108, 110 may be activated or deactivated, e.g., by processor 102. In this way, EVAD 100 can be installed on either the left or right side of door 400 and whichever of sensors 108, 110 is closest to and oriented toward door 404 may be activated at the time of installation of EVAD 100 and whichever of sensors 108, 110 is furthest away and oriented away from door 404 may be deactivated. Sensors 108, 110 may be activated or deactivated by processor 102 in response to user input to EVAD 100 or receiving a signal from the computing device of a technician servicing or installing EVAD 100.

A sensing surface (e.g., an optical lens) of sensor 108 is oriented toward the exterior of surface 154 of housing 150 and a sensing surface (e.g., an optical lens) of sensor 110 is oriented toward the exterior of surface 156 of housing 150. In one aspect, sensors 108 and 110 are disposed interior to housing 150 and the sensing surface of sensor 108 is oriented toward or disposed within an opening in side 154 of housing 150 and the sensing surface of sensor 108 is oriented toward or disposed within an opening in side 156 of housing 150 to enable detection by each sensor exterior to each side of housing 150.

In one aspect, as shown in FIG. 16, sensor 108 is coupled to portion 103 of circuit board 101 and disposed within housing 150 behind light cover 134A and sensor 110 is coupled to portion 105 of circuit board 101 and disposed within housing 150 behind light cover 134B. In this aspect, sensors 108, 110 may be optical sensors and the optical lens of each sensor is disposed in corresponding openings 135A, 135B of each light cover 134A, 134B. The optical lens of sensor 108 is configured to enable light from the exterior of housing 150 to be passed or provided to sensor 108, but to block light emitted by light cover 134A, such that the measurement or detection of sensor 108 is not interfered with by the light emitted by cover 134A. The optical lens of sensor 110 is configured to enable light from the exterior of housing 150 to be passed or provided to sensor 110, but to block light emitted by light cover 134B, such that the measurement or detection of sensor 110 is not interfered with by the light emitted by cover 134B.

Referring to FIGS. 18 and 20, EVAD 100 is mounted proximate to door 404 and sensor 108 is active because it is disposed closest to door 404 and sensor 110 is inactive. The sensor surface (e.g., optical lens) of sensor 108 is oriented in a direction 111 toward an area exterior to side 154 of housing 150 and has a field of view 113. In one aspect direction 111 is pointed away from side 154 of housing 150 and toward a bottom corner of door 404 that is furthest away from EVAD 100. Surface 154 may be approximately perpendicular to surface 408 of wall 400 and direction 111 may be approximately parallel to surface 408. In another aspect, direction 111 may be directed toward a center of the opening of door 404. Sensor 108 is configured to detect motion indicative of a user entering or exiting through door 404. In one aspect, sensor 108 has a field of view 113 that is adjacent to and/or encompasses a portion of door 404 and the door opening. The detection distance of sensor 108 is selected based on the distance from sensor 108 to the furthest side of the door from sensor 108 such that sensor 108 can detect motion across the width of the door 404. It is to be appreciated that the field of view 113 and direction 111 of sensor 108 may be adjusted in the same manner as described above in relation to sensor 106.

It is to be appreciated that direction 107 of sensor 106 is at an angle relative to direction 111 of sensor 108.

When sensor 108 detects motion, sensor 108 is configured to send a signal indicating the detected motion to processor 102. In response to receiving the signal from sensor 108, processor 102 is configured to send a signal to controller 302 of the access control system that motion indicative of passage through door 404 has been detected by EVAD 100. The signal sent to controller 302 may include identifying information uniquely identifying the particular door 404 that EVAD 100 is mounted proximately to (or identifying the particular EVAD). The signal sent to controller 302 may aid controller 302 in identifying forced entry or forced door events, where a user forces a door 404 open (or walks through a door 404 without authorization). In this regard, over time and use of a door 404, door sensors, such as sensor 306, may become loose or trigger an alarm condition even when door 404 has not been forced open. Thus, controller 302 may be configured to treat a signal from sensor 306 indicating forced entry as being a false positive unless controller 302 also receives a signal from processor 302 indicating the side sensor 108 (or side sensor 110 if the EVAD 100 is mounted on the other side of the door) has detected motion indicative of user movement through the door 404. If controller 302 receives a signal from sensor 306 and receives a signal from processor 302 that motion has been detected by the side sensor 108, then controller 302 will determine that a forced door event has occurred and transmit a signal to EVAD 100 that a forced door event has occurred.

It is to be appreciated that each of the features described above in relation to sensor 108 may also be used in the operation of sensor 110 when EVAD 100 is mounted on the other side of door 404 than what is shown in FIGS. 18 and 20.

It is to be appreciated that although EVAD 100 is shown in the figures and described as having sensors 108, 110 on both sides of housing 150, in other aspects EVAD 100 may be manufactured in two versions, where each version has a sensor on only one side of housing 150 (i.e., side 154 or side 156) such that activation or deactivation of the appropriate side sensor is not necessary.

It is to be appreciated that although sensors 108/110 are shown in the figures and described above as being disposed behind covers 134A, 134B, in other aspects, sensors 108/110 may be disposed on or behind any portions of sides 154, 156 respectively, and configured such that sensors 108/110 detect motion or passage through door 404 and within field of view 113.

In one aspect, processor 102 is configured to use the signals from sensors 106 and 108/110 (whichever is enabled) in the manner described above when processor 102 is in a "ready" state, i.e., processor 102 has not received an access denied or access granted signal from controller 302. In this aspect, if processor 102 receives an access denied or access granted signal from controller 302, processor 102 may be configured to ignore, i.e., take no action based upon or in response to, motion detection signals received by one or both of sensors 106 and/or sensor 108 (or 110, if it is enabled).

For example, if an access denied signal is received by processor 102 from controller 302 of the access control system, processor 102 is configured to take no action based upon or in response to any signals detected by front sensor 106 for a predetermined period of time. The processor 102 however will still take the above-described actions based on signals from an active side sensor 108/110 (i.e., transmit a signal to controller 302). In one aspect, the predetermined period of time is in a range of 7-10 seconds that processor 102 will not take action based upon signals from front sensor 106. This features is useful when a user is denied access through a first side of door 404 by providing a user credential to EVAD 100A that is denied by controller 302 such that when the user passes by EVAD 100B on the other side of door 404, and sensor 106 of EVAD 100B detects motion, processor 102 of EVAD 100B will take no action based on the detection of sensor 106 and will not output the unnecessary notification to the user to provide the user credential, since the user is not approaching from the side of EVAD 100B. However, processor 102 will still send a signal to controller 302 if motion is detected by sensor 108 (or sensor 110) to indicate if a user has forced (or attempted to force) door 404 open after providing a denied or unauthorized user credential.

Moreover, if an access granted signal is received by processor 102, processor 102 may be configured to ignore, i.e., take no action based upon or in response to, motion detection signals from any of front sensor 106 and/or side sensor 108 (or 110, if it is enabled) for a predetermined period of time. The predetermined period of time may be in a range of 7-10 seconds that the processor 102 will not take action based upon signals from front sensor 106 and/or side sensor 108/110. This feature is useful when a user is granted access through a first side of door 404 by providing an accepted user credential to EVAD 100A such that when the user passes by EVAD 100B on the other side of the door 404, and sensor 106 of EVAD 100B detects motion, processor 102 of EVAD 100B will take no action based on the detections of sensor 106 and will not output the unnecessary notification to the user to provide the user credential, since the user has already provided the user credential to EVAD 100A and is not approaching from the side of EVAD 100B. Moreover, processor 102 in each of EVAD 100A and EVAD 100B will take no action based on the detections of side sensor 108 (or sensor 110), since any passage through door 404 that is detected is not forced and is an authorized access.

In one aspect, the processor 102 is configured to control the various sets of output indicators or notifications (e.g., screen 130, speaker 124, light indicators 132A, 132B) of the EVAD 100 to output different combinations of indications or notifications based on different triggering events that occur. Some examples are provided below in accordance with aspects of the present technology.

a. Responsive to an access granted triggering event (e.g., triggered by receiving an access granted input signal from controller 302), processor 102 controls the light indicators 132A, 132B and the background of the display 130 to display a green color, the display 130 to display the text message "Access Granted", and the speaker 124 to play a predetermined audio file.
b. Responsive to an access denied triggering event (e.g., triggered by receiving an access denied input signal from controller 302), processor 102 controls the light indicators 132A, 132B and background of the display 130 to display a red color, the display 130 to display the text message "Access Denied", and the speaker 124 to play a predetermined audio file.
c. Responsive to an emergency triggering event (e.g., triggered by receiving an emergency input signal from controller 302, e.g., when pull station 304 is pulled), processor 102 controls the light indicators 132A, 132B and background of the display 130 to blink blue, the display 130 to display the text message "Emergency, Please Exit", and the speaker 124 to play a buzzing sound and/or a predetermined audio file.
d. Responsive to pre-alarm or forced entry triggering event (e.g., triggered by receiving a pre-alarm input signal or forced entry signal from controller 302 that stays latched until it's cleared), processor 102 controls the light indicators 132A, 132B and background of the display 130 to blink yellow, the display 130 to display the text message "Pre-Alarm" or "Forced Entry" or "Forced Door", and the speaker 124 to play a buzzing sound.

e. Responsive to tamper triggering event (e.g., triggered by signals from the tamper sensors of the EVAD, that stays latched until it's cleared), processor 102 controls the light indicators 132A, 132B and background of the display 139 to blink red, the display 130 to display the text message "Tamper Alarm", and the speaker 124 to play an alarm sound.

It is to be appreciated that the above-described list of triggering events and combinations of outputs or notifications controlled by processor 102 is exemplary and that processor 102 of the EVAD 100 may be configured with many different responses to different triggering events.

In one aspect, EVADs 100 may include a camera 128, such as, an Internet Protocol camera for capturing one or more images and/or video of the exterior of the EVAD 100. The images/video captured by the camera 128 may be provided to processor 102, stored in memory 120, and/or be provided to the central controller 302 of the access control system. In one aspect, the camera 128 may be used for facial recognition, e.g., by processor 102 and/or the central controller 302 of the access control system. In one aspect, processor 102 is configured to trigger the camera 128 to captures images and/or video in response to a trigger condition (e.g., detecting of motion by sensor 106, detecting a tamper condition from one or more of the tamper sensors 112, 114, in response to determining based on a signal from central controller 302 that access is to be denied to a user (e.g., user did not provide user credential or provided credential that wasn't authorized), in response to determining based on a signal from central controller 302 and/or sensor 108/110 that a user attempted to pass through the door 404 the EVAD is mounted to without being authorized to do so. The camera 128, speaker 124, and display 130 of the EVAD 100 may be configured to cooperate with the processor 102 and communication module 118 of the EVAD 100 to enable video calls with another device, such as central controller 302, another EVAD 100, or a computing device of a user.

In one aspect, processor 102 is configured such that, via direct user input through the touch screen 130, buttons 122, etc., to the EVAD 100, the functions and/or settings of the EVAD 100 are programmable (i.e., upon initial installation) and reprogrammable (i.e., after installation and initial use). For example, the user inputs received by the EVAD, e.g., through the touch interface 130, may enable the changing of one or more settings of the EVAD and/or the operation of the components (sensors 104, camera 128, reader 116, display 130, light indicators 132A, 132B, etc.) of the EVAD 100. In this way, the EVAD 100 does not need to be removed from its mounted position or physically changed (e.g., rewiring the internal components of the EVAD) to be reprogrammed or to change the operation of the EVAD 100. This may substantially lower servicing costs for the EVAD 100. In some aspects, EVAD 100 may include a Bluetooth communication module (e.g., integrated in communication module 118 or discrete from communication module 118) configured to wirelessly pair with and communicate with a Bluetooth-enabled device (e.g., a smartphone, laptop, etc.) of a user. Once paired, the processor 102 of the EVAD 100 may receive commands or inputs through the Bluetooth communication with the Bluetooth-enabled device to program and reprogram the functions and settings of the EVAD 100 and/or receive software updates for the EVAD 100. In this way, a technician or other user may service and maintain the EVAD 100 wirelessly through the Bluetooth communication.

As shown in FIG. 16, in one aspect, EVAD 100 may include a shroud 118 for enabling EVAD 100 to be used in outdoor environments that may be exposed to various weather conditions. The shroud 118 includes a first portion 188 and a second portion 191, where second portion 191 projects from portion 188. Portion 188 is configured to couple with the wall bracket 196 and/or housing 150. Portion of shroud 191 project or extends beyond front panel 151 of housing 150 when shroud 188 is coupled to EVAD 100, such that EVAD 100 may be protected from environmental elements (such as rain). Another benefit may be that physical user input (e.g., touches to touch screen 130, pressing buttons 122, and/or pressing keys on reader 116), such as entry of authorization codes, to EVAD 100 may be at least partially concealed from outside observers. Portion 191 is shaped such that at least a portion (e.g., proximate to the bottom side 160) of sides surfaces 154, 156 of housing 150 are not concealed when shroud 188 is coupled to EVAD 100. In this way, indicator lights 132A, 132B are not blocked from being viewable exterior to the EVAD 100 and sensor 108/110 are not blocked from sensing motion on either side of housing 150.

Referring to FIGS. 21-30, an EVAD 200 is shown according to aspects of the present technology. It is to be appreciated that EVAD 200 may include any of the features described above in relation to EVAD 100, unless otherwise indicated herein. Moreover, it is to be appreciated that, unless otherwise indicated, reference numbers of EVAD 200 that correspond to the reference numbers of EVAD 100 (i.e., 101 vs. 201, 120, vs. 220, 1XY vs. 2XY) include the same features (i.e., sensor 206 includes the above-described features of sensor 106, etc.).

As described above in relation to EVAD 100, EVAD 200 includes a reader 216 and is mountable proximate to an access point (e.g., door 404) and configured for use in an access control system for receiving user credentials and communicating such credential to a central controller 302.

In one aspect, EVAD 200 includes a subset of the features of EVAD 100. In this aspect, EVAD 100 includes a single front facing proximity or range sensor 206 that has a sensor surface disposed on a front plate 251 of housing 250. The processor 202 of EVAD 200 is configured to use sensor 206 in the manner described above in relation to sensor 106, i.e., to detect the approach of a user toward EVAD 200 and/or the access point that EVAD 200 is mounted proximately to within a predetermined distance (e.g., 2-3 feet from EVAD 200). The processor 202 of EVAD 200, in response to receiving an indication from sensor 206 of detected motion, causes one or more indicators of the EVAD 200 to output a notification to the user to present their user credential before passing through the access point.

In one aspect, EVAD 200 includes an opening in faceplate 251 such that a sensing surface of sensor 206 is disposed in the opening and is able to sense motion in an area exterior to faceplate 251.

In one aspect, EVAD 200 does not include a touch screen, speaker, camera or side-mounted light indicators (such as indictors 132A, 132B described above) to provide a more simplified design. Rather, EVAD 200 includes a front facing light indicator 232 (e.g., including one or more light, such as, LED(s)). The light indicator 232 is coupled to circuit board 201 and controllable by the processor 202 of the EVAD 200. In one aspect, indicator 232 is disposed on a front surface of faceplate 251 (e.g., through an opening of faceplate 251). If sensor 206 detects motion, processor 202 is configured to activate indicator 232 in a predetermined color.

Figure 30:
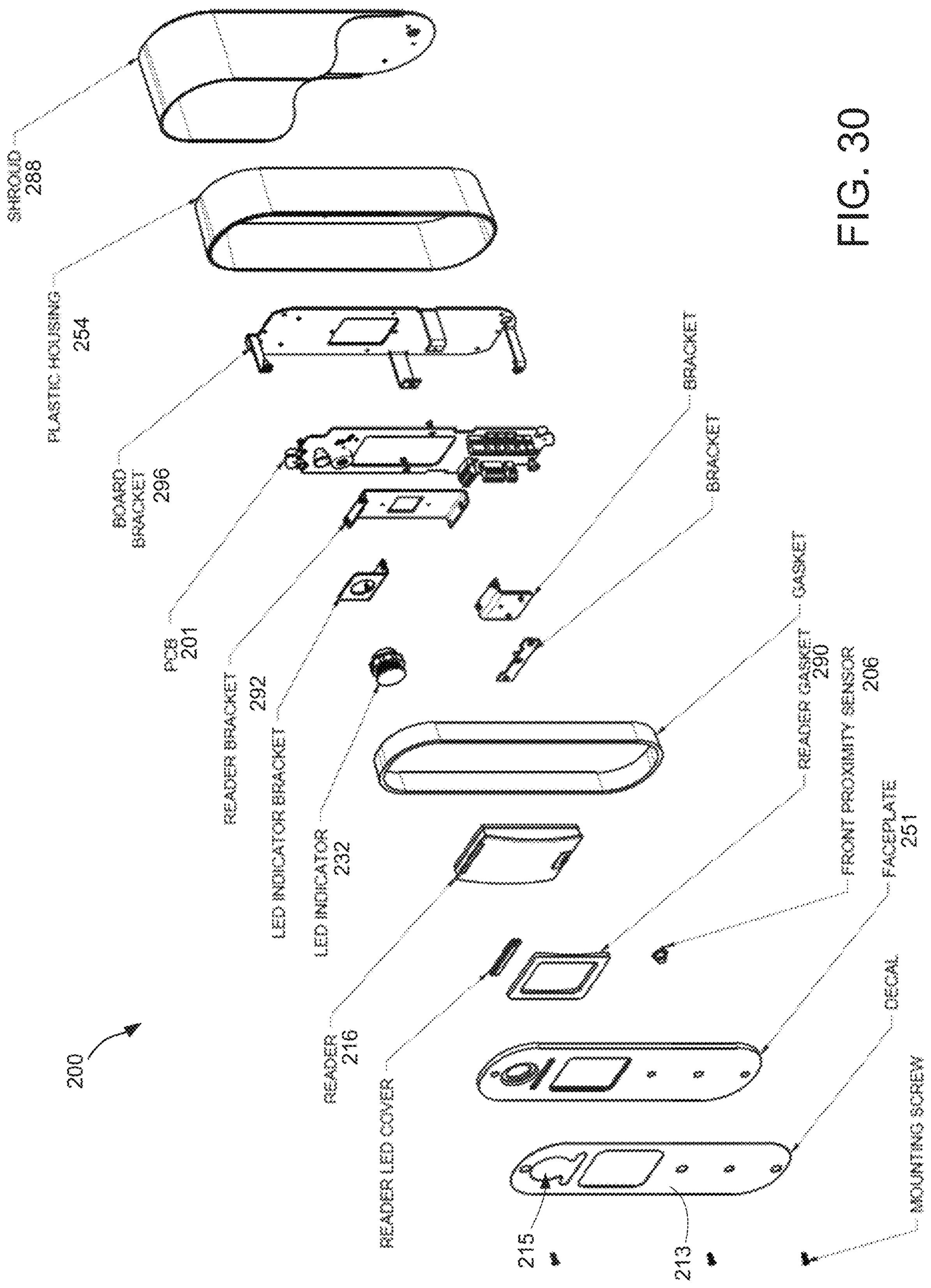
FIG. 30 is an exploded perspective view of the EVAD of FIG. 21.
Figure 31:
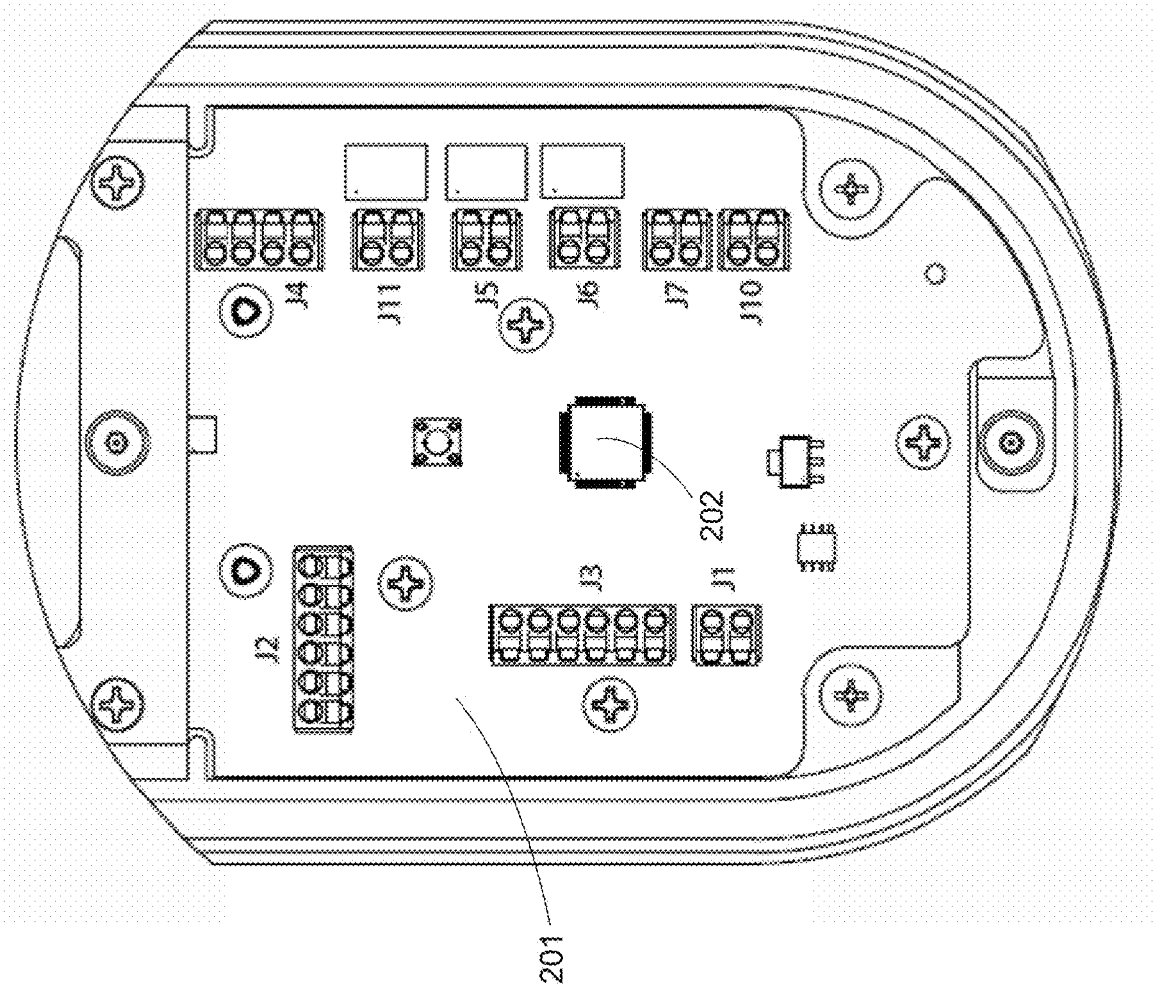
FIG. 31 illustrates a circuit board of the EVAD of FIG. 21.

Processor 202 is configured to control indicator 232 to emit different colors associated with the above-described different triggering events occurring based on the detection of processor 202 and/or signals received by controller 302. In one aspect, as shown in FIG. 30, EVAD 200 includes a decal 213 configured to be disposed over a front surface of faceplate 251. Decal 231 includes openings for indicator 232, reader indicator 117, reader 116, and sensor 106. Around the opening 215 for indicator 232, decal 213 may include text and/or graphic indicators of the meanings associated with the different colors of light that may be emitted by indicator 232. For example, the text/graphic indicators may include text in association with a color (e.g., a colored dot or circle). In one embodiment the indicators comprise (1) the text "Ready" shown in association with the color white, (2) the text "Alarm" shown in association with the color blue; (3) the text "Access Granted" shown in association with the color green; and (4) the text "Access Denied" shown in associated with the color read. In this way when indicator 232 and/or indicator 217 emit a color, a user viewing the color may look to the indication (1)-(4) on decal 213 to determine the meaning of the color.

Figure 32:
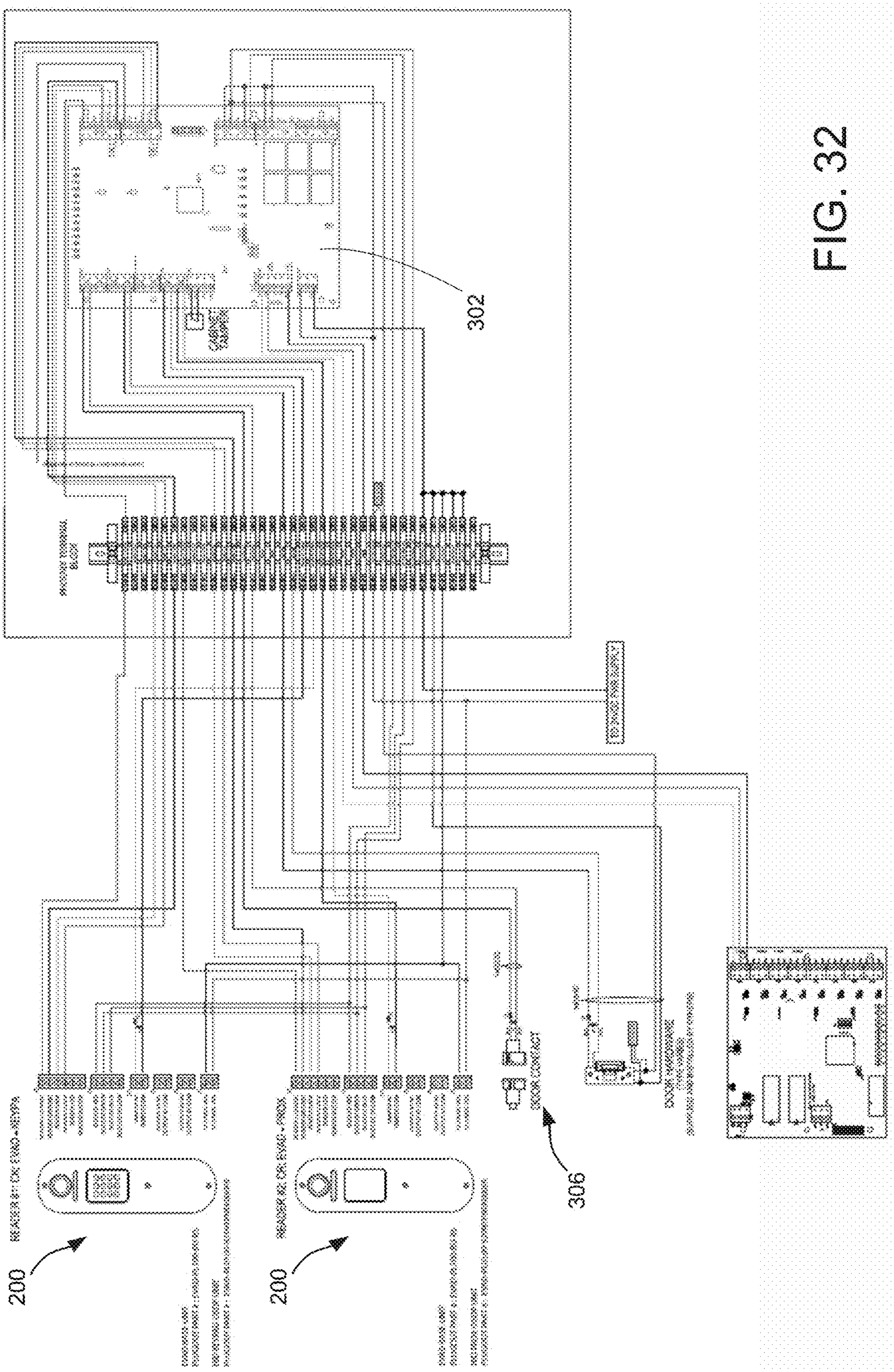
FIGS. 32-34 illustrate wiring schematics of an access control system including the EVAD of FIG. 21.

Referring to FIG. 32, a wiring schematic of an access control system is shown including a pair of EVADs 200 (e.g., mounted on opposite sides of a wall 400 including a door or access point 404) coupled in parallel to controller 302 (e.g., an LNL-1320). Door sensor 306 is shown coupled to controller 302 as well.

Figure 33:
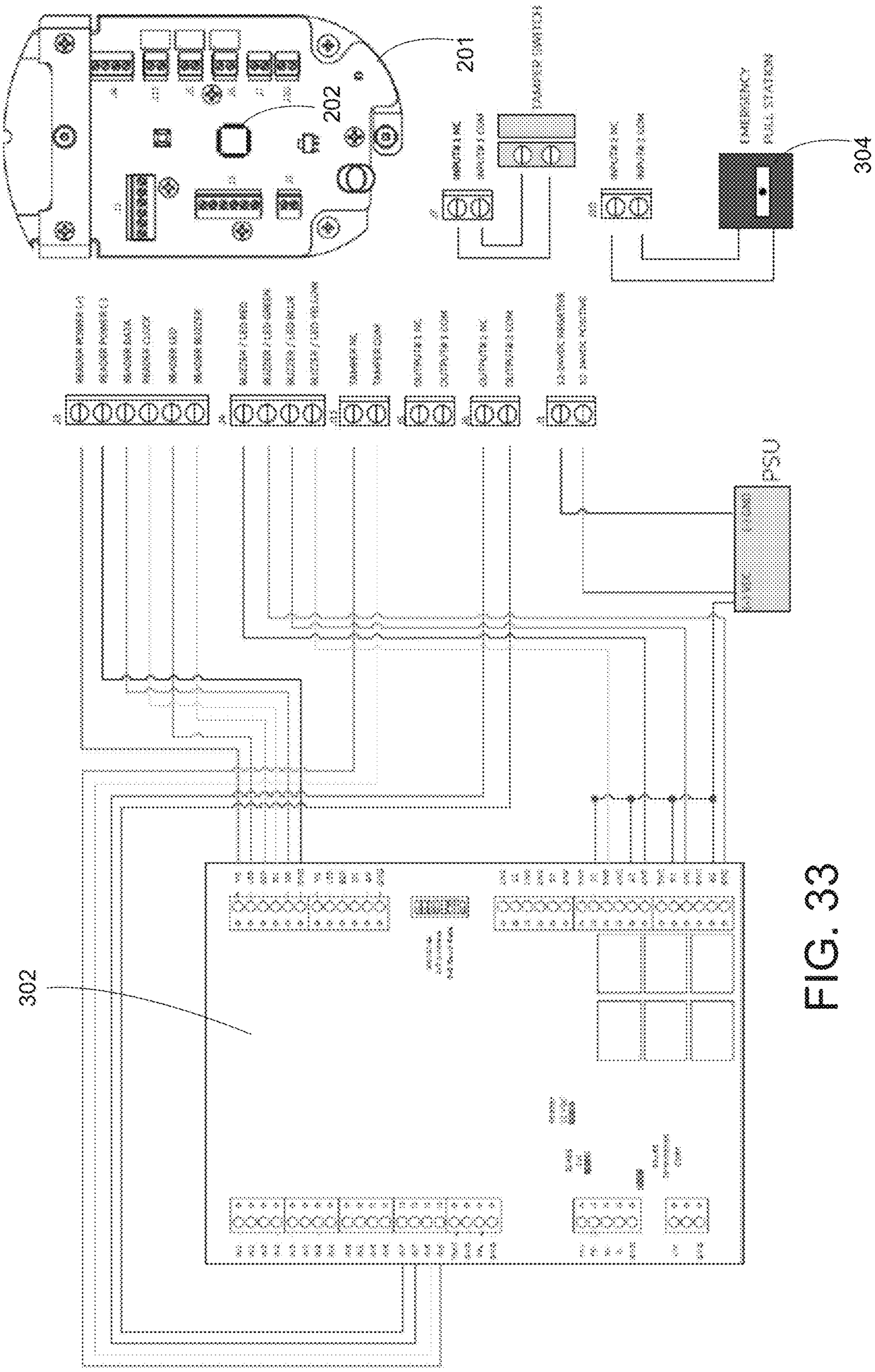
Figure 34:
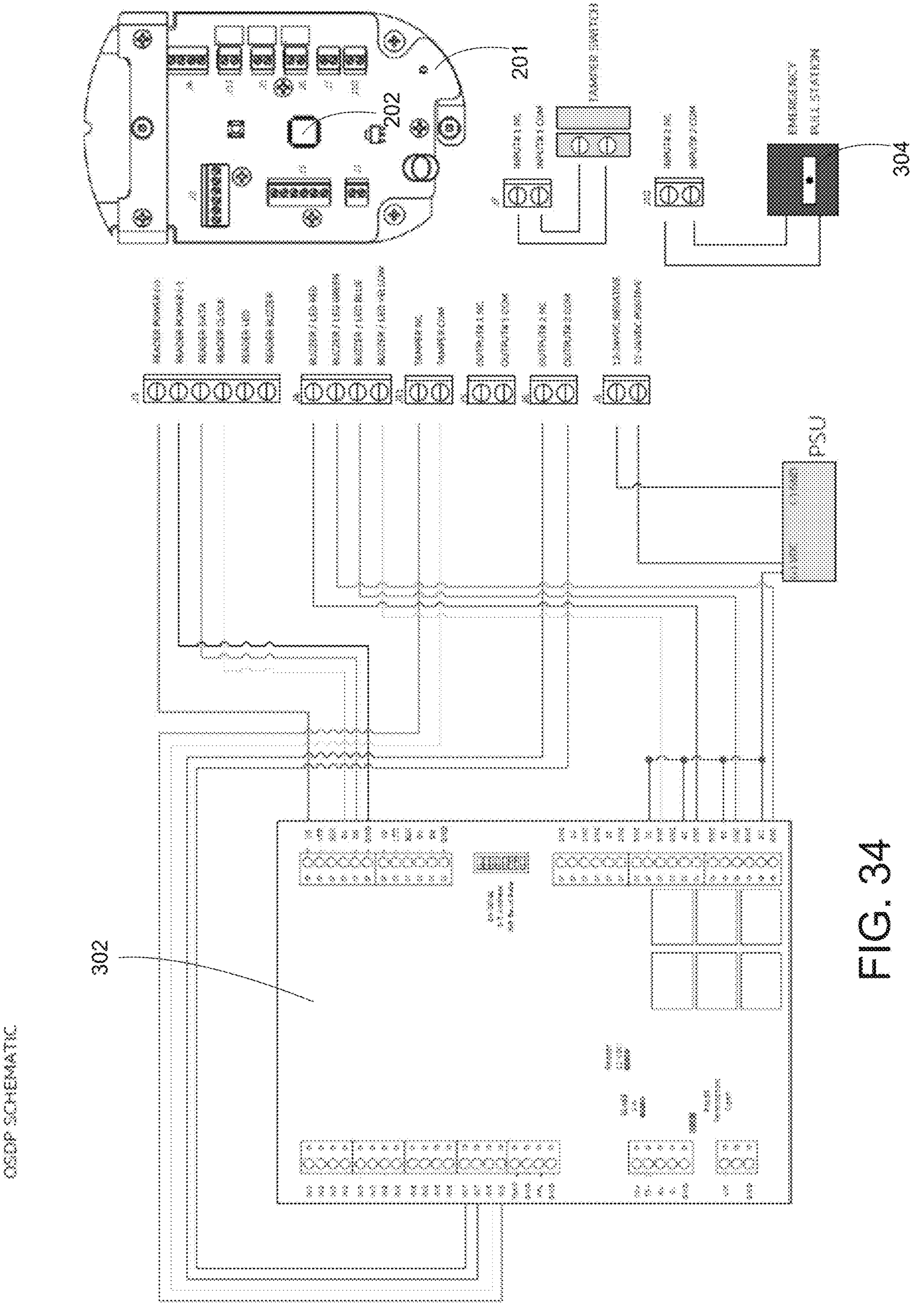

FIGS. 33 and 34 include additional wiring schematics showing the manner that EVAD 200 may be coupled to central controller 302 and the connections between other components of the access control system. It is to be appreciated that EVAD 200 (and EVAD 100) is configured for use with both Weigand and OSDP type (4 wire and 6 wire) wiring that is used with different types of readers, as shown in FIGS. 33 and 34.

It is to be appreciated that EVAD 100 may be coupled to controller 302 and access control system in a similar manner as shown in FIGS. 32-34.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A device comprising:

a housing that is mountable to a stationary surface proximate to an access point to a controlled area;

a reader that receives a user credential;

a first sensor disposed against or proximate to the housing and oriented in a first direction, the first sensor configured to detect motion within a first predetermined distance from the housing;

a second sensor disposed against or proximate to the housing and oriented in a second direction, the second sensor configured to detect motion within a second predetermined distance from the housing, wherein the first direction is at an angle relative to the second direction; and at least one processor configured to trigger at least one output notification if motion within the first predetermined distance from the housing has been detected by the first sensor, wherein the second sensor is configured such that, when the housing is mounted to the stationary surface proximately to the access point, the second sensor is configured to detect motion of a person or object: (1) passing through the access point and/or (2) adjacent to the access point.

2. The device of claim 1, wherein the predetermined distance is in a range of 2-3 feet.

3. The device of claim 2, wherein the at least one processor is configured to send at least one signal to an external computing device if motion is detected by the second sensor.

4. The device of claim 3, wherein the external computing device is a controller of an access control system.

5. The device of claim 1, wherein, in response to receiving a first type of signal from an access control system coupled to the device, the at least one processor is configured to take no action for a predetermined period of time in response to receiving any signals from the first sensor and/or the second sensor.

6. The device of claim 5, wherein, in response to receiving a second type of signal from the access control system, the at least one processor is configured to take no action for a predetermined period of time in response to receiving any signals from the first sensor.

7. The device of claim 6, wherein the first type of signal is a signal indicating that access to the controlled area is granted and the second type of signal is a signal indicating that access to the controlled area is denied.

8. The device of claim 1, further comprising at least one audio or visual component, wherein the at least one processor is configured to:

if motion is detected by the first sensor, control at least one of: (1) the visual component to generate a visual notification visible on an exterior of the housing; and/or (2) the audio component to generate an audio notification, and if motion is detected by the second sensor, send at least one signal to an external computing device.

9. The device of claim 8, wherein the at least one audio component is a speaker configured to generate the audio notification, wherein the audio notification comprises an alarm sound and/or a pre-recorded message, wherein the at least one processor is configured to control the speaker to generate the alarm sound and/or play the pre-recorded message.

10. The device of claim 8, wherein the at least one visual component comprises a display screen and the visual notification comprises text displayed on the display screen and/or a change in background color displayed on the display screen, wherein the at least one processor is configured to control the display screen to display the text and/or change the background color.

11. The device of claim 8, wherein the at least one visual component comprises one or more indicator lights and the visual notification comprises activation of the one or more indicator lights, wherein the at least one processor is configured to control the one or more indicator lights.

12. The device of claim 1, further comprising a camera configured to capture at least one of an image and/or video exterior to the housing.

13. The device of claim 1, further comprising a tilt sensor configured to detect tilting of the housing, wherein the at least one processor is configured to trigger an alarm condition if the at least one processor determines based on at least one signal from the tilt sensor that the housing has been tilted by at least a predetermined angle relative to a baseline position of the housing.

14. The device of claim 1, further comprising a third sensor configured to detect a distance between the housing and the surface that the housing is mounted to, wherein the at least one processor is configured to trigger an alarm condition if the at least one processor determines, based on at least one signal from the third sensor, that the distance between the housing and the surface has changed.

15. The device of claim 1, wherein, when the housing is mounted to the surface proximately to the access point, the second direction is approximately parallel to the surface.

16. The device of claim 1, wherein the second sensor has a predetermined field of view and, when the housing is mounted to the surface proximately to the access point, the predetermined field of view of the second sensor encompasses and/or is adjacent to at least a portion of the access point.

17. The device of claim 1, wherein the second predetermined distance is selected such that the second sensor is configured to detect motion across a width from a first side to a second side of the access point.

18. The device of claim 1, wherein the access point comprises a door and a door opening, and the surface is a surface of a wall of a premises, wherein the door and door opening are disposed in the wall.

19. The device of claim 1, wherein the housing has an interior and the first sensor and the second sensor are disposed in the interior of the housing.

20. A device comprising:

a housing that is mountable to a stationary surface proximately to an access point to a controlled area;

a reader that receives a user credential;

a first sensor disposed against or proximate to the housing and oriented in a first direction, the first sensor configured to detect motion within a first predetermined distance from the housing;

a second sensor disposed against or proximate to the housing and oriented in a second direction, the second sensor configured to detect motion within a second predetermined distance from the housing, wherein the first direction is at an angle relative to the second direction; and at least one processor configured to trigger at least one output notification if motion within the first predetermined distance from the housing has been detected by the first sensor, wherein the second sensor is configured such that, when the housing is mounted to the stationary surface proximately to the access point, the second sensor is configured to detect motion of a person or object: (1) passing through the access point and/or (2) adjacent to the access point, wherein at least one of the first direction and the second direction is adjustable.

21. A device comprising:

a housing that is mountable to a stationary surface proximately to an access point to a controlled area, the housing comprising a front portion and a side portion oriented at an angle relative to the front portion;

at least one audio or visual component;

a first sensor disposed against or proximate to the front portion of the housing and configured to detect motion within a first predetermined distance from the housing and within a first predetermined field of view, wherein the first sensor is oriented toward an area exterior to the front portion of the housing;

a second sensor disposed against or proximate to the side portion of the housing and configured to detect motion within a second predetermined distance from the housing and within a second predetermined field of view, wherein the second sensor is configured such that, when the housing is mounted to the stationary surface proximately to the access point, the second predetermined field of view encompasses and/or is adjacent to at least a portion of the access point and the second sensor is configured to detect motion of a person or object: (1) passing through and/or (2) adjacent to the access point, wherein the second sensor is oriented toward an area exterior to the side portion of the housing; and at least one processor, configured to:

if motion is detected by the first sensor, control at least one of: (1) the visual component to generate a visual notification visible on an exterior of the housing; and/or (2) the audio component to generate an audio notification, if motion is detected by the second sensor, send at least one signal to an external computing device.

* * * * *